Nov. 5, 1957    B. GÄRTNER    2,811,830
AUTOMATIC SPEED REGULATOR FOR TURBOJET
ENGINES HAVING A CONTROLLABLE NOZZLE
Filed Dec. 15, 1953    9 Sheets-Sheet 7

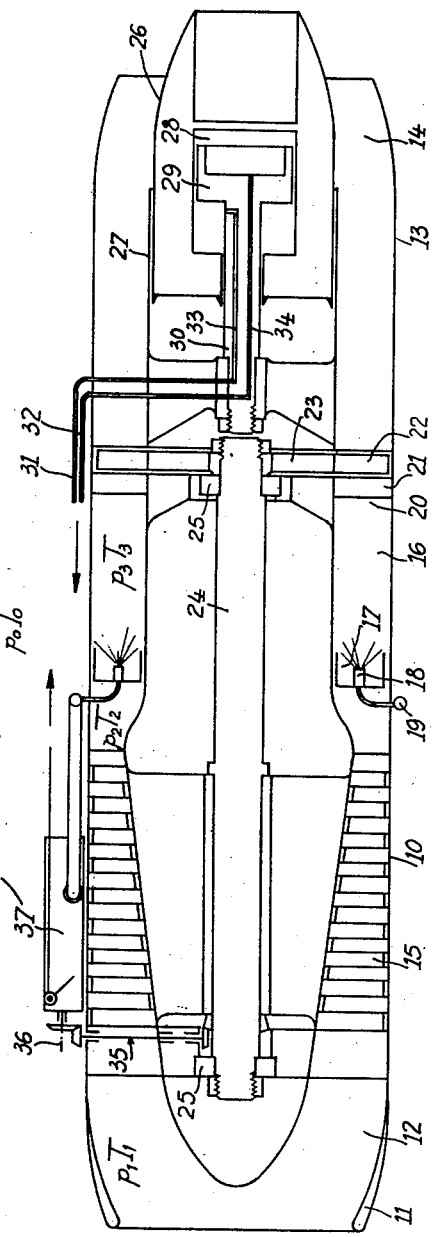

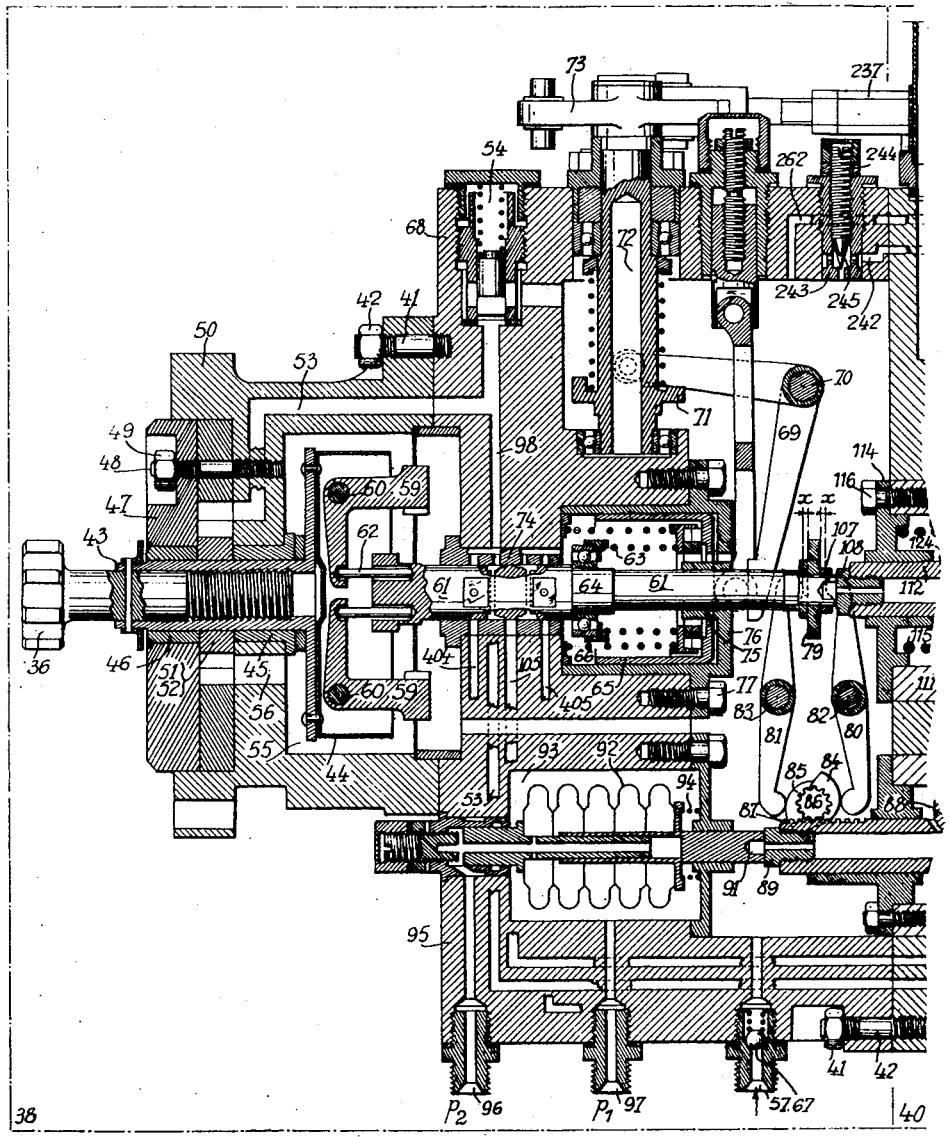

United States Patent Office 2,811,830
Patented Nov. 5, 1957

2,811,830

AUTOMATIC SPEED REGULATOR FOR TURBOJET ENGINES HAVING A CONTROLLABLE NOZZLE

Berthold Gärtner, Paris, France, assignor to Bronzavia S. A., Paris, France, a French body corporate Application December 15, 1953, Serial No. 398,355

Claims priority, application France December 24, 1952

18 Claims. (Cl. 60—35.6)

The present invention relates to fuel feed devices for machines utilizing as a source of power the energy gained from heating and expanding air which is previously compressed. It has more particularly for object to provide an automatic speed regulator for turbojet engines having a controllable nozzle.

The following reference symbols will be employed throughout the ensuing description.

|  | Pressure | Absolute Temperature |
|---|---|---|
| Exterior to the engine | $p_0$ | $T_0$ |
| On the inlet side of the compressor | $p_1$ | $T_1$ |
| On the outlet side of the compressor | $p_2$ |  |
| On the outlet side of the combustion chambers |  | $T_3$ |

Use will also be made of the following reference symbols:

$D$ = volume of air discharged per second by the compressor,
$N$ = rotational speed,
$Sd$ = minimum section of the turbine distributor,
$St$ = transverse area of the nozzle,
$P$ = thrust,
$\sigma$ = thrust coefficient = $p/Sdp_0$
$Q$ = fuel consumption.

The object of the invention will be better understood and the description rendered more clear if a few established conceptions are first discussed.

A study of the operation of a turbojet engine will show that there are numerous parameters underlying the operation of such a machine.

For instance, there may be mentioned:

The rotational speed,
The ratio $p_2/p_1$,
The ratio $T_3/T_0$,
The nozzle transverse area,
The Mach number.

The control of a turbine engine would be an almost insolvable problem if there were no relation between the various aforementioned parameters and the fuel consumption.

Two diagrams (Fig. 1 and Fig. 2) illustrate the importance of the factors affecting the operation of a turbojet engine.

It is known that if the ordinates represent the ratio $p_2/p_1$, and the abscissae the ratio $$\frac{D}{\sqrt{T_1}}$$

the range of the characteristics of a dynamic compressor is represented by an assembly of curves grouping the identical values of the parameter $$\frac{N}{\sqrt{T_1}}$$

Fig. 1 represents a diagram of this type, which will be termed the "compressor diagram."

On this group of curves have been superimposed the curves of the discharge of the turbine distributors. These curves, if the critical speed is attained in the distributor, appear as straight lines passing through the origin.

It is clear, then, that for a given coupling a knowledge of $$\frac{N}{\sqrt{T_1}}$$

for example, and the ratio $T_3/T_0$ is sufficient to determine the discharge and the pressure ratio of the compressor.

Fig. 2 represents the thrust diagram of the machine. It is obtained by representing the ratio $St/Sd$ as ordinates and the thrust coefficient, defined by the thrust divided by the product $Sd \times p_0$, as abscissae. It is clear that the thrust may be fully defined if the two ratios $$\frac{N}{\sqrt{T_1}}$$

and $T_3/T_0$ are known for a given machine.

Fig. 2 shows, moreover, how a variation in the transverse area of the nozzle affects the thrust. Thus, if N remains constant and $St$ increases, i. e. if the nozzle is enlarged, the temperature $T_3$ and the thrust decrease. Inversely, a decrease in the transverse area of the nozzle results in an increase in both the temperature $T_3$ and the thrust.

Thus two principal parameters enter into the control of turbojet engines, namely $$\frac{N}{\sqrt{T_1}}$$

and $T_3/T_0$. It so happens that these parameters, whose importance in the performance of a turbojet engine has just been discussed, are also those which must be limited for safe operation. The linear speed at the mean diameter through the vein is determined by thermodynamic considerations. The upper limit is determined by the maximum permissible stress in the most highly stressed components of the moving parts. It is therefore necessary, if fractures are to be avoided, to limit the rotational speed, i. e. the linear speed at a given diameter.

There are two reasons why the temperature $T_3$ should be limited. Firstly the temperature $T_3$ directly affects the creep limit of the materials employed in the manufacture of the turbine blades and discs, and, secondly, the ratio $T_3/T_0$ directly affects the air flow to the compressor.

As the turbine-compressor is designed for a given value of $T_3$, any increase in $T_3$, with a constant rotational speed, would tend to displace the point of operation up to the surge limit, which will be defined hereinafter.

Since the rotational speed is the easiest parameter to ascertain, it is convenient to select $$\frac{N}{\sqrt{T_1}}$$

as the regulating parameter. In most cases, it is sufficient to consider merely N, since the variations in the absolute temperature T, are negligible.

Furthermore, it is clear that if the various characteristic curves of a turbojet engine (for example the fuel curves) present any singularities at all, the parameter N is the only one that permits the various thrust values to be continuously followed.

In thus selecting the basic parameter, it is possible to devise a control or regulation for a fixed engine rating or operation, but the transitory operation ranges (accelerations and decelerations) require in addition certain precautions. Thus certain special precautions are necessary for preventing overheating in the course of accelerations and extinction and surging of the compressor in the course of decelerations.

Accelerations

When, for a given rotational speed, the discharge from a dynamic compressor is throttled or valved, the pressure $p^2$ increases until the aerodynamic load on the blades is in excess of the design load of the blade profile and surging occurs.

Appart from the flow irregularities incident to surging, the latter has a detrimental effect on the operational life of the machine owing to the accompanying vibrations. The surge limit constitutes, then, a limit it is advisable not to exceed. However, in general, compressors of turbojet machines are designed to run in the region of the surge range, for it is in this region that maximum efficiency is obtained.

Now, the discharge from a compressor of a turbojet machine may be throttled, as is clear from Fig. 1 where the surge line is represented in dash-dot line, by increasing the temperature $T_3$. This temperature is therefore very important in respect of acceleration and an excessive increase in this value should be carefully avoided. The effect this temperature has on compressor operation suggests a relationship between the value $T_3$ (or fuel flow) and a pressure characteristic of the compressor, at least so far as concerns the transitory operational ranges.

The permissible excess of fuel in the course of an acceleration is necessarily different at high and low performance ranges. This difference is clearly evident if the curve C, representing the fuel consumption at sea level is compared with a curve M, representing the maximum permissible amount (Fig. 3). These curves change with change in altitude, and in Fig. 4 it is seen that the permissible excesses of fuel (curve M) at altitudes above sea level are less than those at sea level for the same rotational speed of the turbine.

Among the pressure characteristics of the compressor $p_2-p_1$ (or $p_2-p_0$) is the only quantity that substantially takes into account the permissible excesses of fuel. It is therefore convenient to relate the permissible excess of fuel to $p_2-p_1$.

Decelerations

When, by a controlled variation in the fuel supply, the rotational speed of the machine is decreased there is a risk of extinction due to an excessive drop in the injection pressure $d'$. If the curve $m$, representing the minimum fuel flow, is superimposed on the curves in Figs. 3 and 4, it is seen that the curve $m$ has the same peculiarities as the curves M representating the maximum flow, i. e. the permissible fuel deficiencies are greater at high speed than at low speed and at sea level (Fig. 3) than at high altitude (Fig. 4). Once again it is seen that the difference $p_2-p_1$ (or $p_2-p_0$) gives the best indication of the rotational speed and of the load on the turbojet engine.

A system that limits fuel excesses may, if it is reversible, therefore also limit fuel deficiencies.

One of the objects of the invention is to provide a regulator with which it is possible, for a given position of the pilot control lever, to hold the rotational speed N constant, this regulator controlling to this end the fuel flow, and to maintain $T_3$ constant by varying the transverse area of the nozzle, since for the same temperature at the outlet of the chambers there exists at high rotational speeds an exact ratio between the fuel flow and the value $p_2-p_1$.

Another object of the invention is to construct a regulator with which it is possible to limit the excesses of fuel to prevent overheating and surging of the compressor, this limitation being accomplished as a function of $p_2-p_1$ (or $p_2-p_0$). This regulator also permits the limitation of fuel deficiencies and thereby prevents the extinction of the engine, this limitation also being obtained as a function of $p_2-p_1$ (or $p_2-p_0$).

A further object of the invention is to provide an astatic regulator.

Yet another object of the invention is to provide a regulator wherein the whole range of engine operational conditions and rotational speeds, from idling to full throttle and including the allowable conditions of engine operation during accelerations and decelerations, are automatically controlled by a single member (for example a movable sleeve). The foregoing objects are attained by means of the regulator according to the present invention, which comprises in combination: a governor-type speed detector which acts on a control slide, a speed selecting device mechanically connected to the control slide, a device for detecting the magnitude of the difference $(p_2-p_1)$ between the pressures at the compressor outlet and inlet, a device for limiting the fuel excesses and deficiencies, the latter device being controlled as a function of the value $p_2-p_1$, a device for the progressive metering and throttling of the fuel which comprises in essentials a second slide integral with an amplifying piston hydraulically connected to the control slide and a movable sleeve cooperating with the second slide, the amount of fuel injected or metered being controlled by the axial movements of this sleeve while the angular movements of this sleeve, controlled by a "$\Delta p$ regulator," controls the size of the fuel escape aperture (valving) for maintaining a constant pressure drop across the metering aperture, the automatic speed regulator further comprising a nozzle control device including a movable member which is mechanically connected to the movable sleeve and cooperates with a slide hydraulically connected to the detector of the value $p_2-p_1$.

Other features and advantages of the invention will be apparent from the ensuing description with reference to the accompanying drawings, which illustrate by way of example an embodiment of the invention.

Figs. 1 to 4 show diagrams whose description has already been given,

Fig. 5 shows a longitudinal axial sectional view of a turbojet engine comprising a controllable nozzle and an automatic regulator according to the invention, Fig. 6 is a diagrammatic illustration of the regulator according to the invention, Fig. 7 is an enlarged diagrammatic sectional view of this regulator, Fig. 8 is a sectional view on line 8—8 of Fig. 7, Fig. 9 shows a detail of Fig. 8 in a particular position, Fig. 10 is a sectional view, to a larger scale, of an assembly of rotative nozzles or jets forming part of the regulator, Fig. 11 is a sectional view on line 11—11 of Fig. 10, Fig. 12 is a sectional view on line 12—12 of Fig. 10, Fig. 13 is an enlarged view of a detail of Fig. 8 with certain parts shown in section, Fig. 14 is a view of the same detail in a direction perpendicular to that of Fig. 13, and Fig. 15 is a diagram showing the distribution of the fuel flow through the small and large injectors for the whole operational range of the engine.

Figure 6:
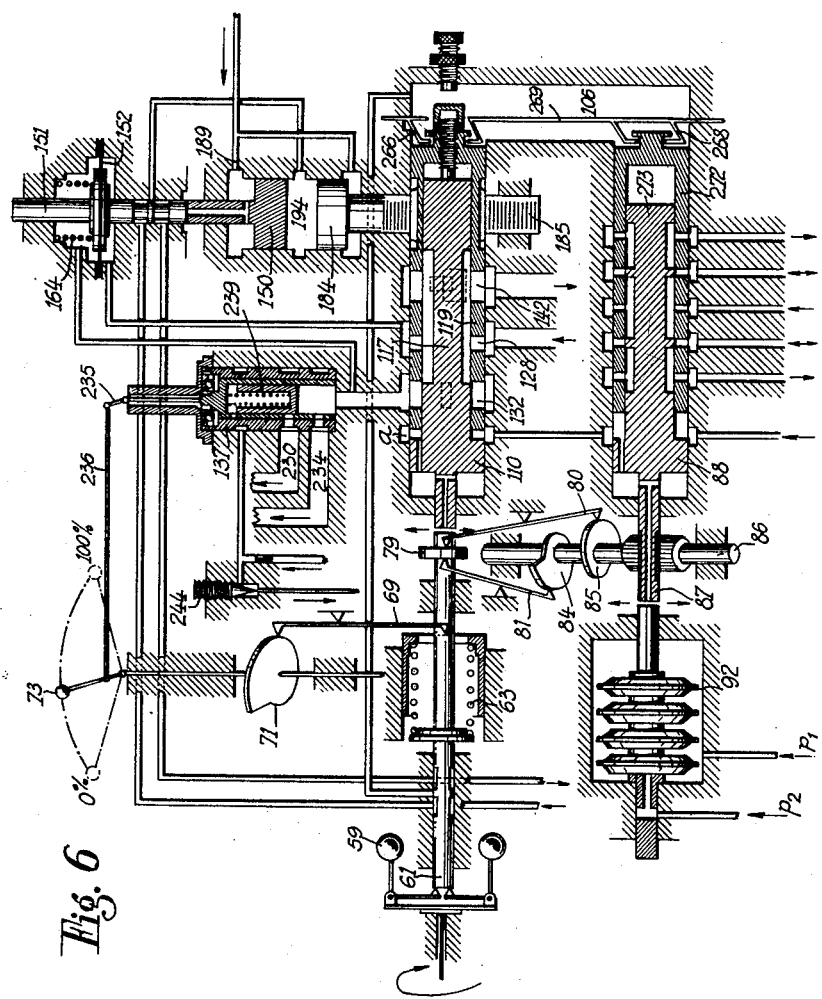

DESCRIPTION OF THE GENERAL LAYOUT
(Figs. 5 and 6)

Referring firstly to Fig. 5, an aircraft power unit of the turbojet type, carrying the reference numeral 10, comprises an inlet nozzle 11, shaped at its frontal portion to form an air intake 12, and an exhaust duct shaped at its rear portion to form a jet or exhaust nozzle 14. A dynamic compressor 15—here shown as an axial-flow compressor but which of course may be a centrifugal compressor—delivers compressed air to the annular combustion chamber 16—or to a plurality of cylindrical combustion chambers equispaced around the axis of the engine—which contains burners 17. The burners 17 comprise injectors 18 which are fed by a main annular piping 19. Axially adjacent the combustion chamber is a distributor 20 which delivers hot air and the products of combustion through fixed blades 21 to the blades 22 of a turbine wheel 23. The latter and the compressor 15 are mounted on a common shaft 24 which is journalled in bearings 25.

The air admitted in the intake 12 is compressed by the compressor 15 and passes to the chamber 16 where it is heated by the combustion of the fuel provided by the injectors 18. The expanded air and the products of combustion pass through the blades 22 of the turbine 23, thus furnishing the power necessary to drive the compressor 15, and thereafter escape to the atmosphere through the nozzle 14 and thus propel the aircraft. The propulsion of the aircraft may also be obtained wholly or in part by a propeller driven by a forward extension of the shaft 24 in general through a reduction gear (not shown in the drawing).

Figure 7:
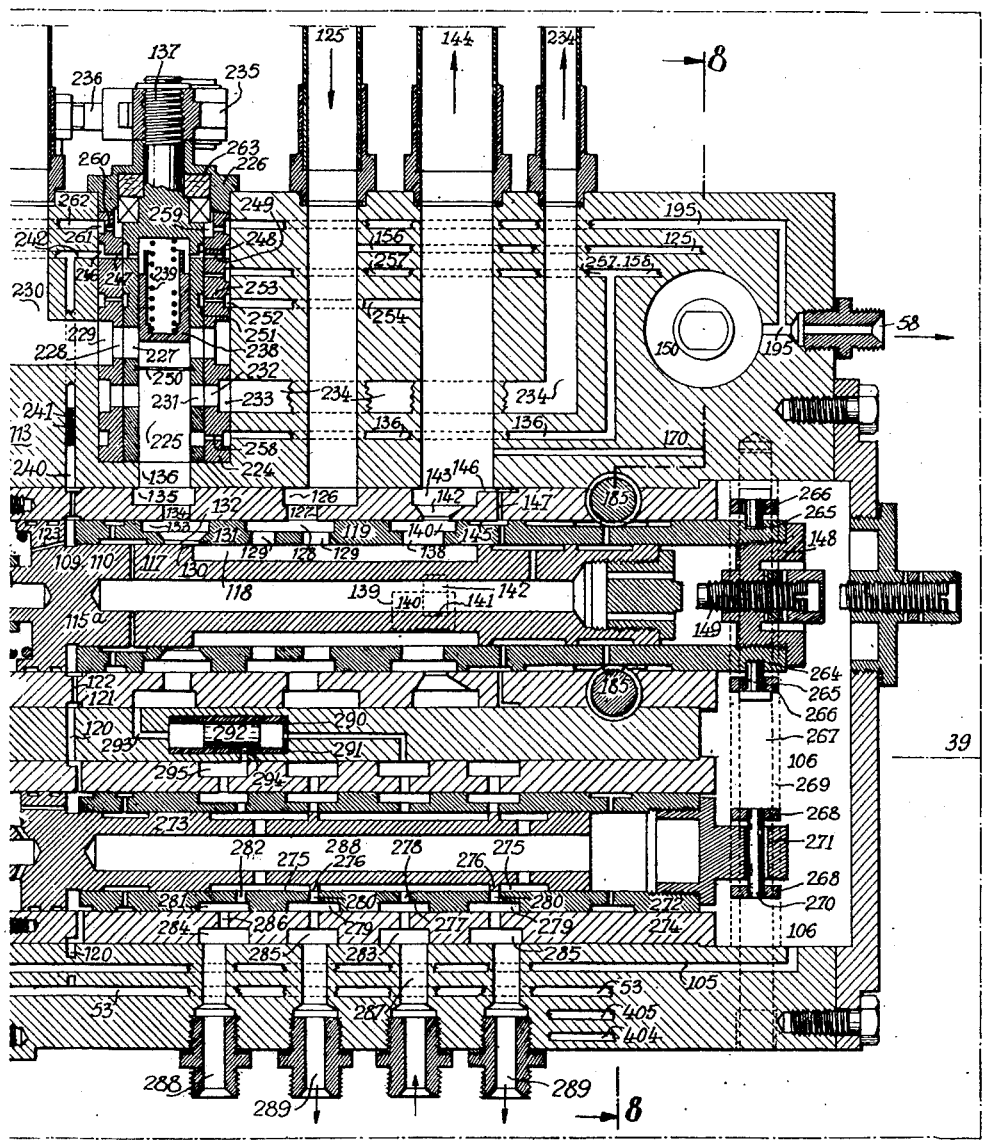

The cross sectional area of the nozzle may be varied by moving a cone 26 in a fixed sleeve 27 disposed inside the nozzle. The cone 26 carries in the middle a cylinder 28 whose piston 29 is integral with, through the medium of a rod 30, the sleeve 27. The supply of liquid under pressure arrives through either one of two pipes 31 and 32 leading from a fuel feed and power controlling device the assembly of which is designated by the reference numeral 37. This device constitutes more particularly the object of the invention and was hereinbefore and will be hereinafter termed a regulator. This regulator is fully described hereinafter and is illustrated at Fig. 7. It comprises a lever 73 connected through a link L to the pilot's lever in the cockpit (not represented). Fuel is fed to the regulator through a pipe 125 and returned to the fuel tank through a pipe 144. As hereinafter described, two fuel pipes connect the regulator to the burner piping. In Fig. 5, these pipes are diagrammatically represented by one pipe F. The pipes 31 and 32 communicate respectively with passages 33 and 34 provided in the slide or rod 30 of the piston 29. The liquid under pressure may be thus conducted to one side or the other of the piston 29.

By way of example the regulator is represented as being installed above the compressor 15 at the periphery of the motor. The driving connection of the device 37, which is necessarily related to a system of weights which detects the rotational speed, is accomplished in this case generally by means of a vertical shaft passing through one of the arms supporting the front bearing of the compressor 15. Hence shaft 36 of the regulator 37 is driven in rotation by a shaft 35 and two sets of bevel gears.

A description of the general constructional features and mode of operation of the regulator will now be given. This regulator permits an automatic regulation or control of the turbojet engine under high and low speed conditions while satisfying the above-mentioned conditions and in particular the following:

(a) Regulation of the fuel excesses and deficiencies in the case of acceleration and deceleration.

(b) Nozzle adjustment; these adjustments being related to the value $p_2-p_1$.

This description is made with reference to the diagrammatic drawing of Fig. 6. The regulator may be considered as comprising the following sub-assemblies:

a—A device for detecting the speed associated with a device for selecting the speed, the latter being connected to the pilot's throttle control lever.

b—A device for limiting the fuel excesses and deficiencies.
c—A metering device.
d—A control device for the nozzle.

DETECTING DEVICE AND SELECTING DEVICE

The weights 59 act on a control slide 61 which at the established engine rating is balanced between the force due to the centrifugal force of the weights, and the force exerted by a selector spring 63. The fixed end or abutment of this spring may be displaced in accordance with the profile of a selector cam 71 by a lever 69 which bears against the latter and against the cup of the spring. The cam is rotated by operating the pilot's control lever 73.

*Device for limiting the fuel excesses and deficiencies*

The control slide 61 carries a double abutment 79. This abutment permits the movements of the slide to be limited in both directions as a function of the position of two levers 80 and 81. These levers bear against two cams 84 and 85 mounted on a common shaft 86.

The shaft 86 is driven by a rack 87 hydraulically connected to a stack of capsules 92 that are subject to the differential pressure $p_2-p_1$. Each variation in $p_2-p_1$, therefore modifies the position of the cams, the distance between the levers and, in consequence, the travel of the slide 61. It is clear, then, that whatever be the extent of the movement imparted to the slide 61 by the pilot control, this movement (that is the excess of fuel) will always be limited as a function of $p_2-p_1$.

Hence the cams 84 and 85 modify, by means of a suitably shaped profile, the law of variation of the fuel excesses as a function of $p_2-p_1$.

*Metering device*

The metering device comprises in essentials:

a. A movable sleeve 119 whose axial movements control the extent of the injection discharge and whose angular movements control the size of the escape aperture. In its balanced position, this sleeve is subject to the constant pressure of the oil acting on the face a and to the opposing pressure of the oil contained in a pressure chamber 106 whose variation in volume permits, by means of an axial displacement of the sleeve 119, a variation in the fuel delivery at a constant speed of rotation.

b. A follower piston 110 whose movements are controlled by the control slide 61.

The fuel, which arrives through a port 128, is directed either toward the injectors through a metering aperture 132 or toward the outlet or valving aperture 142.

c. A device termed a $\Delta p$ regulator which maintains the pressure drop across the metering aperture constant by modifying the cross sectional area of the outlet aperture, i. e. by rotating the sleeve 119. To this end a piston 151 carries a diaphragm 152 held between two cases. This diaphragm is subject to the differential action of the pressures prevailing on either side of the metering aperture. A spring 164 loads this piston 151 in such manner that in the balanced state the force exerted by the spring represents the product of the allowable difference in pressure between the pressures prevailing on either side of the metering aperture multiplied by the effective area of the diaphragm.

A piston 150 which is hydraulically connected to the piston 151, defines between its end and a piston 184 a second pressure chamber 194 the volume of which is controlled by a supply of oil from the rotative nozzle provided on the slide 61. The oil supply from the rotative nozzle is controlled by a shoulder provided on the piston 151. This shoulder puts according to its position, the chamber 194 in communication with either the oil supply pipe or the exhaust pipe. It will be observed, then, that while the piston 151 is unbalanced, the rotative nozzle will modify the volume of the chamber 194. The opposing faces of the pistons 150 and 184 are subject to oil pressure. The piston 150 is subject to the supply pressure released through a nozzle 189, depending on the flow from the hydraulic follow up system. The piston 184 is subject to the constant pipe-line pressure of the oil.

Thus there is realized an astatic system which will be described in detail hereinafter. It will be seen in Fig. 6 that such a system is only balanced when the piston 151 occupies a given position relative to the cases on either side of the diaphragm 152 (feed from the chamber 194 cut off) and when only the position of the piston 184 may be modified according to exterior requirements.

The piston 184 carries a rack which rotates the sleeve 119.

When a disturbance occurs, the slide 61 moves and drives the follower piston 110. The latter, according to the direction of movement of the slide, decreases or increases the throttling of the aperture 132 in the fuel supply circuit leading to the injectors. At this moment the edges of the rotative nozzle provided on the slide 61 uncover the distribution ports and the chamber 106 enters into communication with the oil exhaust or supply. The movable sleeve 119 is then moved as a result of the change in the volume of the chamber 106. The direction of this movement is opposite to that of the movement of the piston 110 so that the rotary nozzle has for effect to follow the action of the piston 110. At the same time the change in the injection flow has brought about a change in the pressure drop between the upstream and downstream sides of the metering aperture. The above-described regulator moves the piston 184, the sleeve 119 rotates, and, in modifying the cross-sectional area of the escape aperture, re-establishes the initial pressure drop.

It will be observed that, in the balanced state, the position of the slide 61 and the piston 110 is fixed relative to the housings. Only the sleeve 119 is variable in position. Furthermore, since the pressure drop across the metering aperture is constant, the fuel flow is proportional to the cross-sectional area of this aperture. Lastly, if the metering aperture is suitably designed, the fuel flow may be proportional to the travel of the sleeve 119.

*Nozzle control*

The movements of the slide 119 are transmitted by a lever 269 to a second sleeve 272. In the sleeve 272 slides a second slide 273 hydraulically connected to the bellows 92.

The sleeve 272 and the slide 273 constitute the control system for the turbojet engine nozzle. The displacement of the sleeve 272 is proportional to the fuel flow. Thus the system can only be balanced if the movements of the slide 273, that is the values of $p_2-p_1$, are also proportional to the fuel flow.

Below a certain injection pressure, a key-operated cock, which is disposed in the region of the hand control (starter) and is connected to the pilot throttle, directs the fuel supply through the aperture 234 to the small flow circuit. The large flow, for an injection pressure governed by a spring 239 and the calibrated pressure of the oil, is fed to the injectors through the aperture 230.

It is clear, then, that the regulator illustrated in Fig. 6 satisfies the above-defined conditions. In particular it can be seen that the regulator is astatic and is as automatic as possible (apart from starting up). The accelerations and decelerations are controlled as a function of $p_2-p_1$. By controlling the cross-sectional area of the nozzle 14 of the turbojet machine there is ensured a constant temperature $T_3$ owing to the relation between $p_2-p_1$ and the fuel consumption.

DETAILED DESCRIPTION (Figs. 7 to 15)

The constructional details and mode of operation of the regulator will now be described with reference to Figs. 7 to 15.

With reference to Fig. 7, it is seen that the regulator according to the invention comprises the following assemblies and sub-assemblies:

Assembly 38 comprising:
   An oil pump.
   A speed regulator with a selector device.
   A device for limiting the accelerations.

Assembly 39 comprising:
   A servo-motor controlling the metering of fuel.
   A metering and valving device.
   A $\Delta p$ regulator which maintains the difference $\Delta p$ between the pressures on the upstream and downstream sides of the metering aperture, constant.
   A servo-motor controlling the valving means.
   A device for distributing the injection fuel flow and a stop control.

Assembly 40 comprising:
   A device for amplifying the value $(p_2-p_1)$ and for adjusting the needle of the turbo-jet engine.

The various units and component parts will be described in turn with reference to Figs. 7 to 14, wherein the parts corresponding to the parts shown in Fig. 6 carry the same reference numerals.

*Oil pump*

With reference to Fig. 7, it can be seen that the assembly 38 comprises two housings 50 and 68 connected together and to the main housing 113 by means of screws or studs 41 and nuts 42. A driving shaft 36 drives the shaft 43, which is journalled in a bearing 45 of the housing 50 and in a bearing 46 fitted in a cap 47. The latter is fixed to the housing 50 by studs 48 and nuts 49 and encloses a gear pump 51 of which only the gear 52, driven by the shaft 43, is shown in the drawing. The gear pump 51 feeds the principal pipe line 53, forming an auxiliary circuit leading to the various servo-motors and other devices, with oil under a constant pressure controlled by a by-pass valve 54. The oil that escapes from this auxiliary circuit collects in a chamber 55 wherein rotates the carrier 44 of the governor weights. The gear pump 51 draws oil from this chamber 55 through an aperture 56.

For purposes of compensating the unavoidable losses of oil (for example that which occurs through the bearings of the driving shaft 36, 43) and preventing the relatively small amount of oil contained in this closed circuit from overheating, the chamber 55 is also in communication with a further auxiliary circuit through two connections 57 and 58 whose bores are given such size that oil losses are compensated and the cooling is satisfactory.

In order to ensure that the chamber 55 does not empty completely and to prevent the entry of air in the auxiliary circuit when the motor stops, the input connection 57 is supplied with a check valve 67 and the outlet connection 58 is mounted at the highest point of the oil supply system.

*Speed regulator*

On the carrier 44 are mounted two weights 59 which are pivotal about pins 60. These weights bear against, through the medium of pins 62, the control slide 61 which is rotated by the carrier 44. An axial displacement of the slide 61 is always possible irrespective of the position of the weights 59. The force exerted on the slide 61 by the weights 59 is balanced by a return spring 63 which will be termed a selector spring. The latter bears against the slide 61 through a bearing 64 and at its other end it is supported by a sleeve 65 which is slidable on a bore 66 provided in the cylinder 76. The position of the sleeve 65 and, in consequence, the pressure of the spring 63 is governed by the position of the lever 69 which is mounted in a pin 70 provided in the housing 68. One of the ends of the lever 69 is in contact with the sleeve 65 and the other end with a surface cam 71. This cam 71 is mounted on a shaft 72 which is rotatively mounted in the housing 68 and is rotated by the pilot control lever 73. The profile of this cam is such as to cause the return spring 63 to offer a range of resistances to oppose the thrust exerted on the slide 61 by the arms of the weights which varies between slow speed and maximum speed according to the position of the throttle lever 73.

The slide 61 is journalled in two bearings 74 and 75. The bearing 74 is fitted in the housing 68. The bearing 75 forms part of the cylinder 76 which is centered in the housing 68 and is fixed to the latter by screws 77.

*Device for limiting accelerations*

At its right hand end, as seen in Fig. 7, the control slide 61 carries a double shoulder 79 which is adapted to abut against either one of the ends of two levers 80 and 81 which are pivotal about pins 82 and 83 fixed in the housing 68. The positions of these levers are controlled by two cams 84 and 85 mounted on a common shaft 86 rotatively mounted in the housing 68. The shaft 86 is rotated by a rack 87 machined on the end of a follower piston 88 housed in the housing 113.

The servo-motor follows the expansion of the bellows 92. It is of the differential type and carries at the left hand end of the rack 87 a nozzle 89 the flow through which is controlled by the nozzle-closing end member 91 of the bellows 92 housed in the chamber 93 in the housing 68. The spring 94 tends to return the bellows 92 to its unexpanded state.

The interior of the bellows 92 is in communication with the pressure $p_2$ (total pressure on the outlet side of the compressor 15) through conduits and a connection 96. The exterior of the bellows 92 and the chamber 93 are subject to the pressure (total pressure on the inlet side of the compressor 15) through a connection 97. The expansion of the bellows 92 is therefore a function of the pressure difference $p_2-p_1$, or, in other words, a function of the rotational speed and the load on the turbojet.

Thus, the space $x$ between the shoulder 79 of the slide 61 and the ends of the levers 80, 81, which controls the maximum displacement of the slide 62, is a continuous function of $p_2-p_1$ and may be slightly corrected, if need be, in accordance with the profile of the cams 84 and 85.

Figure 10:
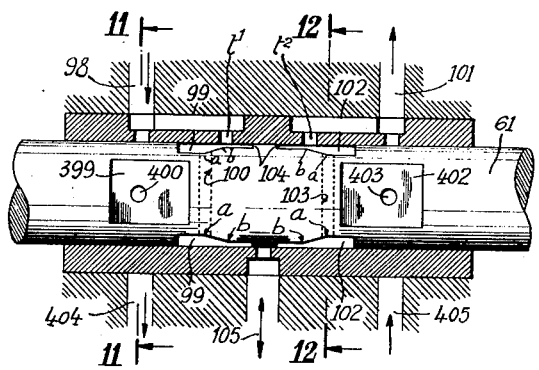
Figure 11:
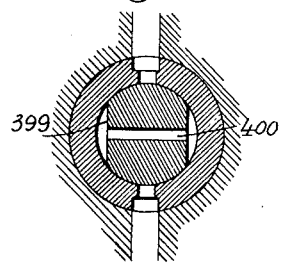
Figure 12:
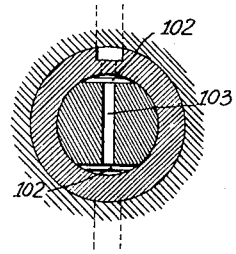
Figure 13:
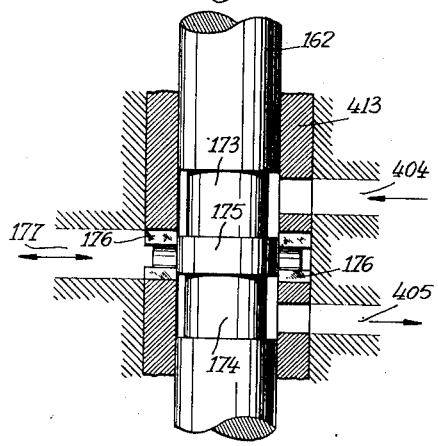
Figure 14:
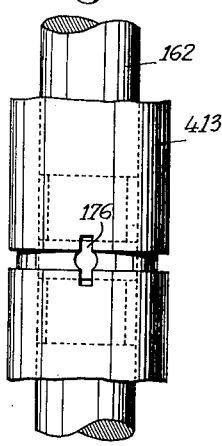

In the bearing 74 of the slide 61 is provided a secondary conduit 98 which communicates with the principal conduit 53, and discharges opposite the recesses 99 and flats 399 machined on the slide 61 (Fig. 10). The recesses 99 are interconnected by a calibrated orifice 100, the flats 399 are interconnected by a calibrated orifice 400 (Figs. 10 and 11). An outlet conduit 101 discharges through the bearing 74 opposite the recesses 102 and flats 402 machined on the slide 61. The recesses 102 are interconnected by a calibrated orifice 103, the flats 402 are interconnected by an orifice 403 (Figs. 10 and 12).

The orifices 100, 400, 103 and 403 will be termed hereinafter rotary nozzles.

The inner shoulders or edges 104 of the recesses 99 and 102 cut off the distribution through a conduit 105 which communicates with the chamber 106. In the event of the driving and regulating system being balanced, i. e. for a rotational speed corresponding to a position of the control lever 73, the edges 104 are always placed in front of the edges of the port for the conduit 105.

Thus, the chamber 106 is neither connected to the oil supply nor to the exhaust. This position of the slide 61 should be noted for purposes of adjusting the space $x$ between the shoulder 79 and the cooperating ends of the levers 80 and 81.

The recesses 99 and 102 of the slide 61 are machined partly on a gradient relative to the axis of the latter (Fig. 10) so that the cross-sectional area of the space between the slide 61 and the bearing 74 gradually decreases in a direction from $a$ to $b$. From the point $b$ up to the position of the edges 104 the cross-sectional areas are constant and are so arranged that the flow or discharge through the rotary nozzles 100 and 103 is minimum for the balanced position of the slide 61.

For a displacement of the slide 61 from its balanced position allowed by a space $x$ (which depends on the instantaneous value of $p_2-p_1$), the recesses 99 or 102 will be larger in front of the ports $t_1$ or $t_2$ in the bearing 74 and will permit an increased flow through the rotary nozzle 100 or 103 and a more rapid variation in the volume of oil in the chamber 106.

It will be seen, then, that the feed or discharge rate of the volume in the chamber 106 varies as the displacement of the slide 61 and is in consequence a function of the changes in the rotational speed and is limited by the instantaneous value of $p_2-p_1$. On the other hand, the rotary nozzles 400 and 403 supply a constant amount of fuel oil for any travel of the slide 61 owing to flats 399 and 402, which are parallel to the axis of the slide 61. The rotary nozzle 400 connects the chamber 194 of the $\Delta p$ regulator to the fuel oil supply through a conduit 404 and the rotary nozzle 403 connects the chamber 194 to the fuel oil exhaust through the conduit 405. A variation in the fuel flow is in this case related to the $\Delta p$ detector 151 as will be hereinafter explained.

*Servo-motor controlling the metering of the fuel*

The right-hand end of the slide 61, as seen in Fig. 7, carries a nozzle closing end face 107 which controls the flow through the control nozzle 108 of the servo-motor 109 which is governed by the actual displacement of the slide 61.

The servo-motor 109 is part of the assembly 39 which comprises the fuel metering and valving members. The differential or follower piston 110 slides in a sleeve 111 mounted in the housing 113. The left end of the piston 110 is machined down to a rod 112 which carries the control nozzle 108 and slides in a cover member 114 which closes the end of a cylinder 115. The cover member 114 is fixed to the fixed sleeve 111 by means of screws 116. A portion of the length of the piston 110 is machined down to form the distributor slide 117. The latter is provided with a recess or groove 118 which is the principal fuel distributing groove.

The annular inner face of a movable sleeve 119 constitutes the wall of the cylinder 115. This sleeve 119 is slidably mounted between the slide 117 and the fixed sleeve 111.

A conduit 120 conducts the liquid under constant pressure from the principal conduit 53 to a groove 121 provided in the fixed sleeve 111. The liquid passes through a number of passageways 122 and enters the cylinder 115 at the periphery of the piston 110.

If it is supposed that the servo-motor 109 is in equilibrium, the movable sleeve 119 is balanced by two opposing forces. One force corresponds to the pressure exerted by the oil chamber 115$^a$ between the annular end faces of the sleeve 119 and the piston 110. The other force corresponds to the pressure of the oil in the chamber 106 which is applied against the right end of the sleeve 119.

However, it should be noted that the movable sleeve 119 undergoes movements which are very different from those of the piston 110 and the slide 117.

The oil under pressure passes from the chamber 115$^a$ to the chamber 115 through an aperture 123. From the latter it is discharged through apertures 124 and the control nozzle 108 in the rod 112. The oil flow is such that the pressure on the left side of the piston 110 is about half the constant pressure exerted on the right side of the piston in the balanced state of the system comprising the control slide 61 and the servo-motor 109.

The dimensions of the piston 110, the nozzle 108 and the aperture 123 govern the distance between the nozzle closing end face 107 and the control nozzle 108 in the balanced state. If this distance is decreased or increased by displacing the slide 61, the pressure on the left side of the piston 110 is modified and the latter moves and thus re-establishes the distance between the end 107 and the control nozzle 108 to correspond to the balanced position.

*Fuel metering and valving device*

The fuel for the fuel supply to the turbojet engine is delivered to the regulator by a high pressure pump (not shown in the drawings) through a pipe 125. The fuel enters a groove 126 in the fixed slide 111 and passes through ports 127 to the groove 128 in the movable slide 119 and through apertures 129 in the latter to the fuel distributing recess 118 in the slide 117. In the recess 118 the fuel flow is divided into two streams. One stream passes between a shoulder 130 on the side 117 and the edges 131 of rectangular calibrated apertures 132 in the movable slide 119, passes through in turn a groove 133, ports 134 provided with a key 137, a groove 135 in the fixed sleeve 111, a pasageway 136 and attains a fuel cock provided with a key 137. From the latter it passes to the injectors through pipes 230 and 234, the key 137 being supposed in the open position. The other stream passes through apertures 138, between the edges 139 of rectangular machined faces 140 provided in the movable sleeve 119 and the edges 141 of rectangular apertures 142 provided in the fixed sleeve 111. Thereafter the fuel flows through a groove 143 into a fuel return pipe 144 (see Fig. 7).

Grooves 145 serve to collect the fuel leakages between the walls of the movable sleeve 119 and the slide 117 and thus prevent the fuel from mixing with the servo-motor fluid. These grooves balance the pressures at the peripheries of the slidable members and thus ensure that the latter operate under good conditions.

Passageways 147 and an annular groove 146 connect the grooves 145 to the fuel return pipe 144.

It can be seen in Figs. 6 and 7 that the cross-sectional areas of the fuel passages between the edges 131 and the shoulder 130 depend only on the axial position of the slide 117 or of the movable sleeve 119 and do not vary when the movable sleeve 119 is rotated.

The cross-sectional area of the fuel passages between the edges 139 and 141 can only vary as a result of a rotation of the movable sleeve 119 and do not vary with an axial displacement of the slide 117 or of the movable sleeve 119.

A plug 148, which is screwed in the movable sleeve 119 in a fluid tight manner, carries an adjusting screw 149 by means of which it is possible to limit the travel of the movable sleeve 119 relative to the slide 117 and thus adjust the minimum fuel flow to the injectors.

*$\Delta p$ Regulator*

A rotary motion may be imparted to the movable sleeve 119 by a servo-motor 150 through the medium of two racks 185. The servo-motor 150 is controlled by the detector 151 which is responsive to the pressure drop across the passage defined by the shoulder 130 and the edges 131. The units 150 and 151 have for effect to rotate the movable sleeve 119, maintain the pressure drop across the passage defined by the edges 131 and the shoulder 130 constant, and thus control the proportion of fuel which escapes.

The detector 151 comprises a diaphragm 152 which is gripped between two casings 113 and 153 and partitions off two chambers 155, 157 provided in the latter. The chamber 155 in the casing 113 communicates, through the conduit 156, with the pipe 125 (fuel supply pipe from the high pressure pump). The chamber 157 in the casing 153 communicates, through a conduit 158, with the passageway 136, (fuel supply to the injectors).

Figure 8:
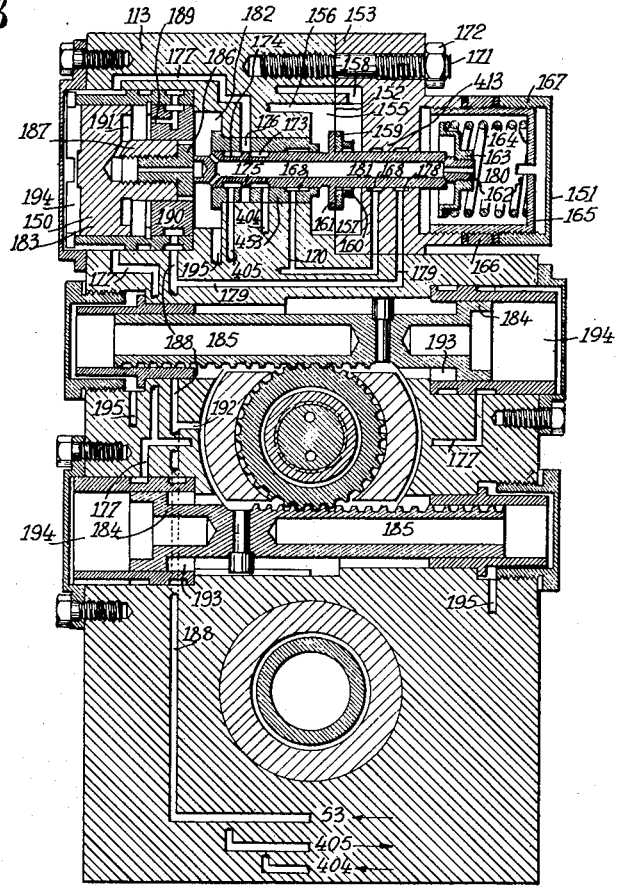
Figure 9:
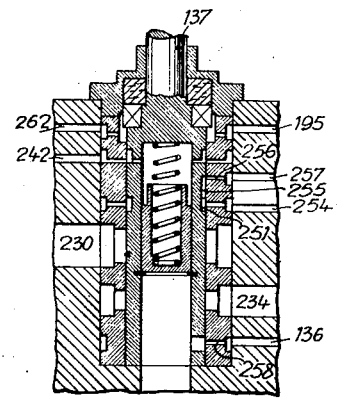

The diaphragm 152 is gripped between a flange 161 provided on a control rod 162 and a plate 159 by a nut 160. The rod 162 slides in two casings 153 and 113 and extends through bearings 413 and 453. At its upper end (on the right as seen in Fig. 8), the rod 162 carries a cup 163 against which bears a spring 164 whose compression is adjusted by an adjustable socket 165 screwed in the casing 153 in which it is adjustable in axial position.

The opposing force of the spring 164, in the balanced state of the system, must be equal to the force produced on the effective area of the diaphragm 152 by the selected pressure drop. The position of the socket 165 is locked by a lock-nut 166 to which is connected an end piece 167.

Annular grooves 168 provided in the bearings 413 and 453 collect the leakages of fuel which occur along the rod 162. A conduit 170 connects the groove 168 to the principal fuel return pipe 144.

The two cases 153 and 113 are secured together by studs 171 and nuts 172 and the periphery of the diaphragm 152 is clamped therebetween.

In the bearing 453 discharge two conduits 404 and 405 opposite grooves 173 and 174 provided in the rod 162 below the lower fuel collecting groove 168. The groove 173 therefore receives hydraulic fluid from the rotary nozzle 400. The groove 174 discharges through the rotary nozzle 403. The two grooves 173 and 174 form between them a flange 175 which covers, in the balanced state of the $\Delta p$ regulating system, the ports 176 of a conduit 177 which is connected to the chamber 194. The ports 176 comprise slots several tenths of a millimeter long (see Figs. 13 and 14). Hence the rate of variation in the volume of chamber 194 is a function of the axial displacement of the $\Delta p$ detector 151.

In the bearing 413 there is, above the groove 168, a groove 178 which is fed with oil under pressure through a conduit 179 in order to lubricate the upper part of the rod 162 and thus prevent penetrations of fuel into the oil circuit. A chamber 180 receives the leakage of oil along the rod 162. This chamber communicates, through a conduit 181, with an escape chamber 182 containing a piston 183 (principal follower piston). The chamber 182 also receives the oil leakages from the lower end of the rod 162 and is connected to the principal oil return chamber or collector 55 through a conduit 195.

*Servo-motor controlling the valving*

The servo-motor 150 comprises a principal piston 183 and two secondary pistons 184. The two pistons 184 are operatively connected by two racks 185 to the movable sleeve 119, so that the resultant of the two circumferential forces is equal to zero. They are controlled by the principal piston 183 solely by means of varying the volume of the chamber 194. The piston 183 is housed below the $\Delta p$ detector 151. The lower end of the rod 162 serves as a nozzle closing face for a control nozzle or jet 186 in the rod 187 of the piston 183.

The supply of oil under pressure for the servo-motor or amplifying system arrives through two conduits 188 and 192. The conduit 188 feeds, through a fixed nozzle or jet 189 in the cover 190, a chamber 191 which is located above the piston 183. The magnitude of the pressure in the chamber 191 is determined by the fluid escape through the control nozzle 186 and is regulated by the distance between the latter and the nozzle closing end of the rod 162. The conduit 192 is connected to two chambers 193 disposed around the pistons 184. The interior chambers 185 of the rack rods communicate, through the conduit 195, with the fluid exhaust outlet.

In the balanced position, the constant pressure prevailing in the chamber 193 tends to compress the oil in the chamber 194. The piston 183 is held in equilibrium under the action, firstly of the pressure $p_0$ of the oil contained in the chamber 194 and, secondly, of the pressure $p_{00}$ which is governed by the distance $d$ between the nozzle 186 and the nozzle closing end of the rod 162. If $d$ decreases, the pressure $p_{00}$ increases up to a value $p_{001}$ which, in urging back the piston 183, compresses the oil contained in the chamber 194 until the value $p_{01}$ is attained and thus causes the displacement of the piston 184.

The various values of $p_0$ and $p_{00}$ are obtained for extremely small variations in $d$. Furthermore, the servomotor is accurately responsive to the displacement of the rod 162.

A displacement of the rod 162 from its balanced position, for example a downward displacement (towards the left in Fig. 8) brought about by varying the value $\Delta p$ may have two effects:

(1) The piston 183 instantaneously follows the displacement of the rod 162 as a result of the resultant increase in pressure in the chamber 191. The two pistons 184 are also displaced as a result of the increase in pressure in the chamber 194.

(2) The flange 175 of the rod 162 uncovers the ports 176. The chamber 194 is fed with oil and the pistons 184 slowly move in the same direction as in the first case in proportion to the increasing volume of the chamber 194.

By means of the racks 185, the two pistons 184 then impart to the movable sleeve 119 a rotary motion. The movable sleeve 119 modifies the cross-sectional area through which the fuel escapes, to the fuel return pipe 144, that is the area of the passage between the edges 139 and 141 and thus adjusts the variation in the pressure drop $\Delta p$ which is the cause of the displacement of the rod 162 relative to its balanced position.

As soon as the initial value of $\Delta p$, is attained, the flange 175 once more covers the parts 176 and the piston 183 returns to its balanced position. Only the pistons 184 assume a new position corresponding to the increased volume of the chamber 194 and to the variation in the fuel escape necessary for the re-establishment of the initial value of $\Delta p$.

*Device for distributing the fuel flow to the injectors and stop device*

A fuel cock or valve completes the fuel circuit leading to the injectors. A key 137 is rotatively mounted in a fixed sleeve 224 which forms a cock support mounted in the casing 113. The key 137 is hollow and is open at the bottom end so that the fuel arriving from the metering system may directly enter the interior 225 thereof. The axial thrust which is exerted upon this key and which is due to the high pressure of injection is absorbed by an anti-friction thrust member supported by the cover 226.

If the key 137 is turned in the direction for opening the cock, the fuel passes through apertures 227 and 228 provided in the key and the fixed sleeve 224. The fuel reaches the large flow injectors through a pipe 230.

The fuel may also pass through apertures 231 provided in the key, holes 232 provided in the fixed sleeve 222, the groove 233 provided in the latter and reach the small flow injectors through a pipe 234.

The upper end of the key 137 carries the lever 235 which is connected by a linkage 236 to the pilot's control lever 73. An axially adjustable sleeve 237 permits the angular position of the key 137 to be adjusted in such manner that, in the stop position of the control lever 73, the apertures 227 and 231 in the key are fully closed and, in the position of the lever 73 corresponding to the idling speed of the turbojet engine, the same apertures uncover a sufficiently large cross-sectional area of the apertures 228 and 232 to allow through the necessary delivery of fuel to the injectors.

In order to derive maximum benefits from the fuel supply to a turbojet engine by means of injectors having different flows or discharges, it is necessary that at least the minimum discharge of fuel occurs only through the small flow injectors and that the large flow injectors only commence to discharge fuel as the rotational speed of and the load on the turbojet engine increase. In this way the pressure of the fuel gradually increases with increase in the flow. In the diagram shown in Fig. 15, which has been given solely by way of example, the injection discharges Q are shown as abscissae and the injection pressures P1 as ordinates. The two thin-line curves represent the discharge from the small injectors (curve on the left) and the discharge from the large injectors (curve on the right). The thick-line curve represents the common discharge. $D_m$ is the value of minimum discharge.

In the special case of a double flow injector the different amounts of fuel supplied by the separate conduits are finally ejected through the same spray orifice. Initially, however, the small amounts of fuel which arrive through the large flow pipe 230 are atomized by means of the energy furnished by the small flow, the two fuel supplies being mixed in the turbulence chamber of the double flow injectors.

To this end there is slidably mounted in the key 137 a piston 238. On one side of this piston is exerted the pressure from the fuel from the metering device. The piston is subject on the other side to a thrust due to a certain pressure of the oil and a spring 239. The pressure of the oil above the piston 238 is regulated by means of a circuit which is a branch of the auxiliary circuit and comprises one conduit 240 leading from the principal conduit 53, a fixed nozzle or jet 241, a conduit 242, a nozzle or jet 243 adjustable by means of a needle valve 244 and a discharge passageway 245. The pressure which prevails in the part of the circuit comprised between the fixed nozzle 241 and the needle valve 244 is transmitted to the top of the piston 238 by the conduit 242, a groove 246 and apertures 247 provided in the fixed sleeve 224, a groove 248 and apertures 249 provided in the key 137. The needle valve 244 permits the oil pressure exerted on the upper face of the piston 238 to be set to the desired value and thus determines the fuel pressure for which the piston 238 leaves the abutment 250 and allows the fuel to commence to flow through the aperture 228 to the pipe 230.

Between the apertures 227 and the groove 248 provided in the key 137, is machined a discharge groove 251 which communicates with the fuel return pipe 144 through passageway 253 and a groove 252 provided in the fixed sleeve 224 and through a conduit 254. For the purpose of reducing the pressure exerted on the packing or seal 263 of the cover 226, the chamber 259 adjoining the anti-friction abutment is connected to the operating liquid escape or return circuit through apertures 260 and a groove 261 provided in the fixed sleeve 224 and through a conduit 262.

In the stop position of the key 137 (see Fig. 9), that is when no fuel is allowed through, a groove 255 provided in the key connects, through a calibrated orifice 257 provided in the fixed sleeve 224, the discharge groove 251 to a conduit 257. The conduit 257 communicates with the conduit 158 which conducts the fuel firstly to the chamber 157 of the $\Delta p$ regulator and, secondly, to the conduit 136 (discharge of the fuel to the injectors) through a calibrated orifice 258.

If, while the engine is running, the lever 73 is suddenly brought to the stop position, the pressure difference $\Delta p$, which is detected by the diaphraghm 52, cannot attain zero owing to the escape through the orifice 256. The action of the $\Delta p$ regulator therefore limits the pressure of the fuel in the pump and in the regulator to a permissible value by always ensuring an escape of fuel.

*Device for adjusting the needle of the turbojet engine nozzle*

To effect an adjustment of the needle of the controllable nozzle by utilizing the property peculiar to turbojet engines, namely that for high rational speeds they have a fuel consumption which is proportional to the values of $p_2-p_1$, it suffices to relate the adjustment of the nozzle to the actual displacement of the movable sleeve 119 and the piston 88 of the detector of the value $p_2-p_1$.

To this end a guide groove 264 is machined on the right end of the movable sleeve 119. In this groove 264 are slidably mounted two lugs 265 which are fixed to two arms of a lever 266 which is pivotal about a spindle 267 mounted in the housing 113. Thus the axial movements of the movable sleeve 119 are transformed into circumferential movements of the lever 266 about the spindle 267 while the sleeve 119 is free to pivot about its own axis.

Another lever 268 fixed to a sleeve 269 integral with the lever 266 is provided with a pin 270 which is engaged in an aperture 271 provided at the closed or right end of the movable sleeve 272. The latter slides between the right-hand extension 273 of the follower piston 88 and a fixed sleeve 224 which also acts as a cylinder for the piston 88.

On the slide 273 are provided recesses 275 and shoulders or flanges 276 which form part of a conventional distribution system for the servo-motor 29 controlling the cone 26 of the nozzle 14. On the movable sleeve 272 are provided a recess 277 having oil supply apertures 278, recesses 279 having distribution apertures 280 and an escape recess 281 having discharge apertures 282. In the fixed sleeve 274 are recesses 283, 284 and 285 which communicate through apertures 286 with the recesses 277, 281 and 279.

The recesses and the corresponding rows of apertures are spaced apart in such manner that for any position of the slide 273 and sleeve 272, the communicating apertures remain open.

The recess 283 provided mid-way along the length of the fixed sleeve 274 is fed with oil under pressure by a conduit 287 forming part of a high-pressure circuit. The recess 284 comunicates with the exhaust circuit of the system through a conduit 288. The recesses 285 feed two distributing conduits 289.

Before attaining the distributing system, the oil under high pressure passes through a balancing valve 290. The latter comprises a sleeve 291 which is fitted in the housing 113 and contains a piston 292. One side of the latter is subject to the injection pressure acting through a conduit 293, and the other side is subject to the oil supply pressure.

When the injection pressure is low, the piston 292 is displaced under the effect of the oil pressure and uncovers apertures 294 which are provided in the sleeve 291 and communicate with the oil escape circuit through a conduit 295. The distribution pressure of the oil therefore always equals the injection pressure.

As the load on the cone 26 of the nozzle 14 is substantially proportional to the injection pressure, substantially equal velocities of displacement of the cylinder 28 may thus be obtained for the same opening between the shoulders 276 of the slide 273 and the apertures 280 in the movable sleeve 272, whatever be the load on the cone. Furthermore, variations in the balanced position of the distributing system as a function of the load on the cone 26 are avoided.

In so far as the proportionality between the engine consumption and the value $p_2-p_1$ is only sufficiently exact for a certain range of engine performance, the ratio of the levers 266 and 268 is so arranged that the device functions in an exact manner in the operational ranges between cruising and full throttle where the recuperation of power by varying the position of the cone 26 may be considerable and desirable.

In the lower operational ranges of the engine the regulation thus established returns the cone 26 to the position thereof which corresponds to the largest cross-sectional jet area by modifying the function $Q=f(p_2-p_1)$.

Operation of the regulator

In the description of the operation of the regulator according to the invention, the following operational conditions will be dealt with:

Loss of equilibrium of the driving and regulating system due to an exterior disturbance.

Loss of equilibrium of the driving and regulating system due to a sudden shifting of the control lever.

The case of acceleration.

The case of deceleration.

The control of the cross-sectional area of the jet nozzle.

Loss of equilibrium of the driving and regulating system due to an exterior disturbance It will be supposed that the engine is running under given operational conditions which correspond to a rotational speed governed by the position of the control lever 73. If there is a sudden decrease in the load on the engine, for example as a result of a change in exterior conditions (change in $p_0$, $t_0$, flying speed), the fuel flow to the injectors is excessive and the speed of the machine increases. The increase in the rotational speed of the engine is detected by the weights 59 which, under the effect of centrifugal force, displace towards the right, as seen in Fig. 7, the control slide 61 and thus compress the return spring 63. At each instant there is a balance between the force developed by the weights and the force developed by the compression of the spring 63.

In its displacement, the slide 61 moves the piston 110 which, by means of the slide 117, causes the cross-sectional area of the metering aperture between the edges 130 and 131 to decrease.

As the slide 61 is displaced towards the right, the shoulder 104 uncovers the conduits 105 and permits a supply of control oil under pressure to be fed to the chamber 106 through the rotary nozzle or jet 100. The movable sleeve 119 is then displaced towards the left and thus further restricts the cross-sectional area of the apertures between the edges 130 and 131.

In the course of the displacement of the slide 117 and of the movable sleeve 119, the pressure difference across the aperture defined by the edges 130 and 131 varies. The $\Delta p$ regulator then enters into action and, through the medium of the servo-motor 150, rotates the movable sleeve 119 in a direction to increase the cross-sectional area of the valving apertures between the edges 139 and 141 and thus increases the fuel flow to the fuel exhaust or escape circuit.

Hence the regulator decreases the fuel flow to the engine, the rotational speed decreases, and the weights 59 and the slide 61 assume their initial positions. At this moment the flange 104 once more closes the conduit 105 and a new state of equilibrium of the regulator is obtained in which the control liquid is neither fed to nor drawn from the chamber 106.

Now if the slide 162 has resumed its initial position at the same time as the slide 61 and if at this moment the cross-sectional areas of the apertures between the edges 130 and 131 and between the edges 139 and 141 are such as to correspond to the new state of equilibrium, the action of the regulator ceases for the moment. If not, the actions of the rotational speed regulator and the $\Delta p$ regulator, which are mutually modified, continue with decreasing effect owing to the slow movement of the movable sleeve 119, slow movement of the pistons 184, and the phase shift between the two regulators.

Loss of equilibrium of the system due to a sudden displacement of the pilot lever (acceleration or deceleration)

ACCELERATION

In the case of a loss of equilibrium of the motor-regulator system being caused by a sudden operation of the control lever 73, for example when the machine is accelerated, the action of the rotational speed regulator is interrupted at the start of this intervention. By moving the control lever 73 suddenly from its idling position to its full-throttle position, the selector spring 63 is compressed by the action of the cam 71 through the lever 69 and the slide or socket 65.

Since the resultant axial force due to the centrifugal force developed by the weights 59 is less than the force exerted by the spring 63, the slide 61 moves towards the left, as seen in Fig. 7, until the flange 79 enters into contact with the end of the lever 81 the other end of which is applied against the cam 85. In this case there is no equilibrium between the thrust due to the centrifugal forces developed by the weights and the thrust of the spring 63. The slide 61 is displaced a certain definite amount by the rise of the profile of the cam 85, shifts the piston 110 and the slide 117, and thereby modifies the cross-sectional area of the fuel passage between the edges 130 and 131 and causes an increase in the fuel flow to the injectors. This fuel flow increase is accurately metered since the difference in pressure across the fuel apertures between the edges 130 and 131 is maintained constant by the $\Delta p$ regulator 150. There is therefore a proportionality between the flow and the rectangular metering aperture.

The bellows 92 detects the pressure difference $p_2 - p_1$ and the variations in its length are transmitted to the follower piston 88 which in turn rotates the cam 85. Thus in the course of an acceleration it is possible at each instant to limit the increase in the fuel flow as a function of the variations in $p_2 - p_1$, with the result that the temperature in the combustion chambers 16 does not become excessive and there is no risk of running the compressor in the surge region of the latter.

In the course of the displacement towards the left of the slide 61, the shoulder of flange 104 uncovers the conduit 105 and permits the evacuation of the control oil contained in the chamber 106 through the rotary nozzle or jet 103. The movable sleeve 119 therefore moves towards the right and thus increases the cross-sectional area of the apertures between the edges 130 and 131. However, the velocity of displacement of the movable slide 119 is very low and the increase of the fuel flow caused thereby is substantially the same as that which corresponds to the increase in the rotational speed of the engine.

Figure 16:
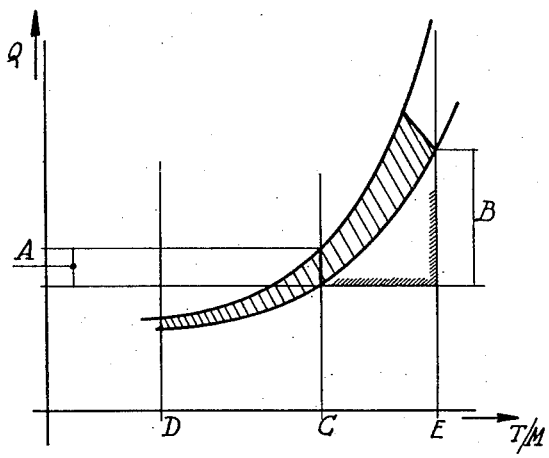
Fig. 16 is a diagram showing the variation in fuel consumption Q as a function of the number of rotations per minute $T/M$, during a period of acceleration.

The displacement of the control slide 61 permitted by the space $x$ in the idling state of the engine is very small and corresponds to the very small increase in the fuel flow which is permissible at the start of the acceleration. These actions of sleeve 119 and slide 61 are illustrated in the diagram shown in Fig. 16, wherein Q is the fuel consumption, T/M the number of rotations per minute, A and B the actions of slide 61 and sleeve 119 respectively, in the case of an acceleration from a position C, D being the idling point and E the full power point of the engine. The aperture $t_2$ (Fig. 10) discharges opposite the flats 102 in the region of the point $b$ and the volume of control oil which flows from the chamber 106 is therefore minimum and causes a very small displacement of the movable sleeve 119.

Generally, a higher rotational speed permits excesses of fuel which are greater in magnitude and the space $x$, governed by the profile of a cam 85, is increased. The acceleration is thus accelerated by the direct action of the slide 117 and by the increase in the velocity of displacement of the movable sleeve 119 due to the fact that the flow through the rotary nozzle 103 increases as a function of the travel of the control slide 61 (see sloping flats in Fig. 10).

The foregoing state of affairs continues until the moment when the flange 79 leaves the end of the lever 81 (under the action of the thrust due to the centrifugal force exerted by the weights, which increases with increase in rotational speed). At this moment the devices which limit the increase in the fuel flow are no longer operable, the slide 61 returns in accordance with the movement of the weights 59, to its balanced position and the new state of equilibrium of the motor-regulator system is attained.

DECELERATION

If the speed of the machine is reduced by suddenly shifting the control lever 73 from its full-throttle position to the idling position, the regulator operates in the following manner:

The slide 61 moves towards the right, as seen in Fig. 7, until the abutment or flange 79 enters into contact with the lever 80 in the position of the latter controlled by the cam 84. The piston 88 and the bellows, which measure the value $p_2 - p_1$, permit, at high rotational speeds, a greater displacement of the slide 61 and a higher velocity of displacement of the movable sleeve 119 and in consequence a greater decrease in the fuel flow than in the idling operational regions of the engine. As the rotational speed decreases, the cam 84 and the lever 80 gradually urge the sleeve 61 to the left so that the fuel flow and the velocity of displacement of the movable sleeve 119 gradually decrease until the rotational speed corresponding to the idling operation of the engine is attained whereupon, owing to the separation of the abutment 79 from the end of the lever 80, the automatic regulation enters once more into action.

This system of regulating the fuel flow when there is a large increase or decrease in the rotational speed caused by a sudden displacement of the control lever 73, also satisfies the special conditions prevailing when the aircraft flies near to sea level or at high altitudes. As the value of $p_2 - p_1$ is a function of flying speed and of altitude and is small at slow flying speed and at high altitude, the cams 84 and 85 permit only small excesses and deficiencies of fuel under these conditions, which correspond to the requirements of the engine.

Figure 1:
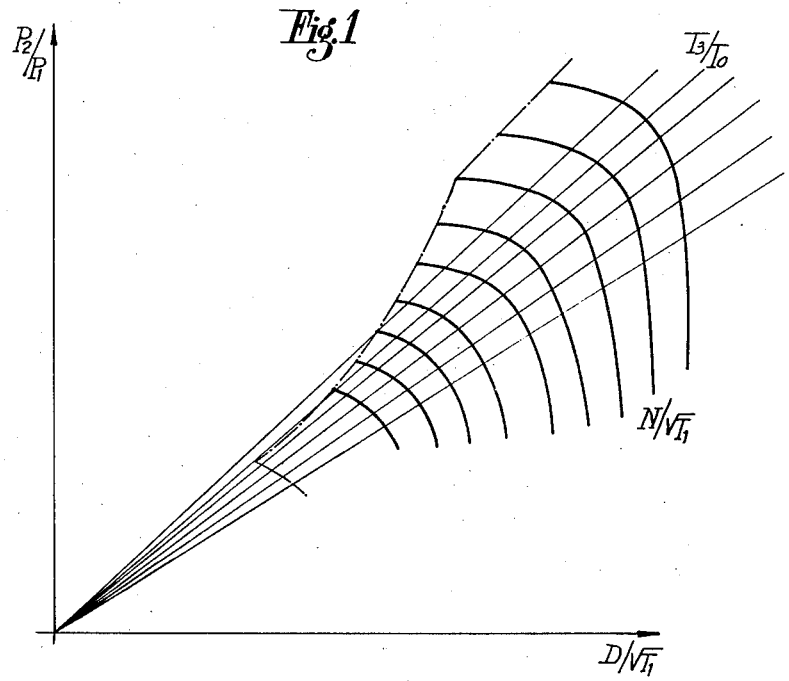
Figure 2:
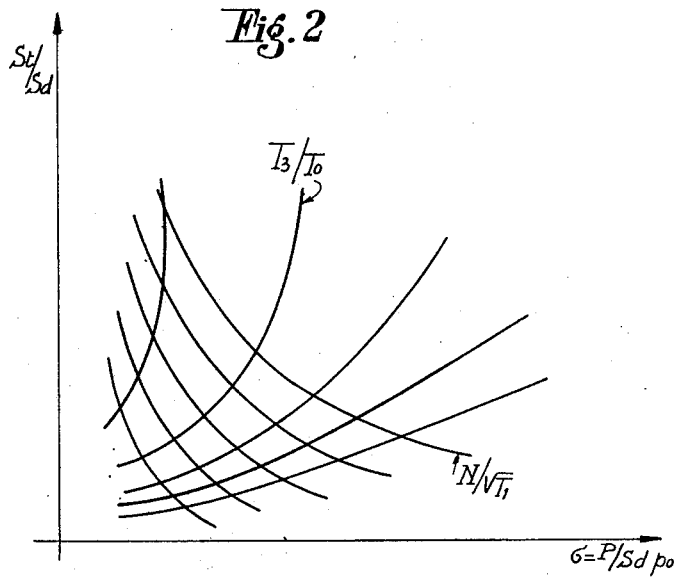
Figure 3:
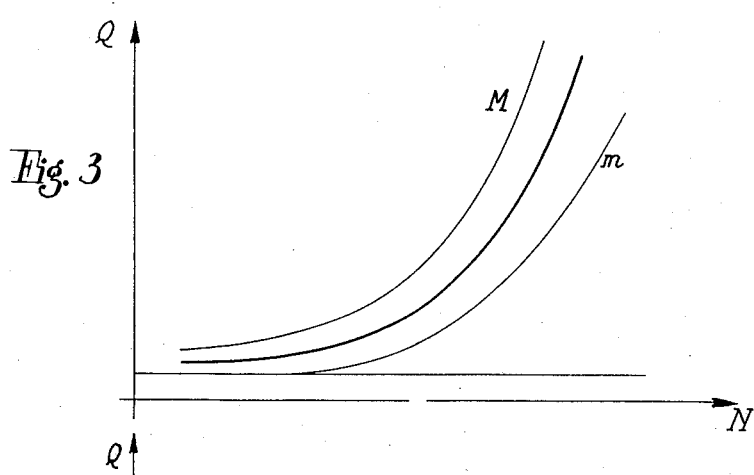
Figure 4:
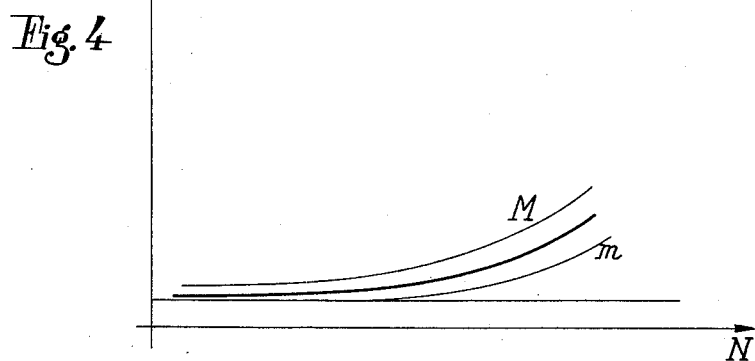
Figure 15:
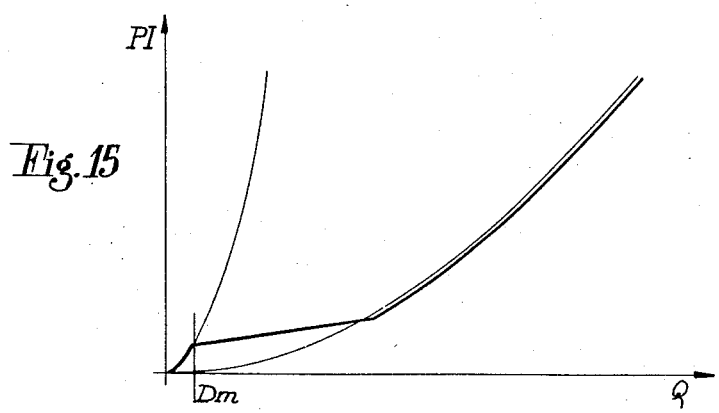

This regulating method may be adapted for different engines by suitably designing the profiles of the cams 84 and 85. The curves shown in Figs. 3 and 4 have been plotted for one profile, which is the same for both cams. All the variations in the fuel flow comprised between the two curves M and $m$ are possible with the profile.

Figure 17:
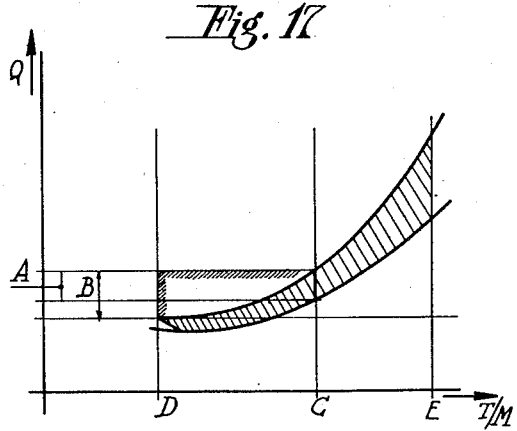
Fig. 17 is a similar diagram relating to deceleration.

The minimum fuel flow before extinction of the combustion chambers occurs is determined by the adjusting screw 149 which, in limiting the travel of the movable sleeve 119 relative to the slide 117, determines the minimum cross-sectional area of the fuel metering apertures between the edges 130 and 131. The actions of sleeve 119 and slide 61 are illustrated in the diagram shown in Fig. 17, where the reference characters have the same significance as those shown in Fig. 16. Fig. 17 relates to a deceleration from point $c$.

*Control of the cross-sectional area of the jet nozzle*

The bellows 92, which measures the pressure differential $p_2 - p_1$, upsets, through the medium of the piston 88, the equilibrium of the slide 273 when the load on the engine or the rotational speed changes. Assuming for example that the value $p_2 - p_1$ increases, the bellows 92 expands and the piston 88 is displaced to the right, as seen in Fig. 7. The slide 273, which is also displaced to the right, causes, in uncovering with its flanges 276 the distribution apertures, the cone 26 of the jet nozzle 14 to travel in such direction as to decrease the cross-sectional area of the gas escape opening between the cone and the nozzle wall 13. At the same time the governor enters into action and, by means of the slide 117 and the movable sleeve 119, increases the fuel flow. For this to occur the sleeve 119 moves to the right. The levers 266 and 268, which are shifted by the sleeve 119, displace the movable sleeve 272 to the right. The latter then decreases the apertures, which were uncovered by the displacement of the slide 273, until they are once again covered and the various values of the rotational speed, the load on the engine and the fuel flow governed by the regulator correspond to a new state of equilibrium. At this moment, the cone 26 of the jet nozzle 14 is held in a position which corresponds to a cross-sectional area of gas outlet that is less than the previous area.

To prevent the displacement of the cone 26 from causing an unstable operation of the regulator it is advantageous to combine efficient damping means with the device controlling the jet nozzle.

It is clear from the foregoing description of the invention and the operation of the latter that the above-mentioned objects are attainable with this regulator. Furthermore, owing to the provision of amplifying means, the drives of the various moving parts of this regulator are sufficiently powerful not to require a very delicate system of lubrication. Hence, although throughout the foregoing description the servomotor or control fluid has been described as being oil, this fluid may be a liquid fuel and in particular the actual fuel used in the turbojet engine burners. This of course simplifies the regulating system considerably.

Although a specific embodiment of the invention has been described hereinbefore, it is to be understood that many changes and modifications may be made therein without departing from the spirit of the invention or the scope of the appended claims.

Having now described my invention what I claim as new and desire to secure by Letters Patent is:

1. In an automatic speed regulator for a turbojet engine including a compressor, fuel injectors, a variable area nozzle and a fuel pump that has a constant fuel discharge per rotation, a device including rotative weights which is responsive to rotational velocity and is rotated by said turbojet engine, a rotative and slidable control slide actuated by said device responsive to rotational velocity, a selector device for selecting the velocities operatively connected with said control slide, a device responsive to the pressure difference $p_2-p_1$ between the pressures at the output and input sides of the compressor, a limiting device for limiting fuel excesses and deficiencies controlled by said device responsive to the pressure difference $p_2-p_1$; a progressive fuel metering and valving device permitting metering of the fuel necessary for the operation of the engine and furthermore a return to the fuel tank of the excess of fuel delivered by said fuel pump, said metering and valving device comprising a follower piston carrying a distributor slide and hydraulically connected with said control slide and a movable sleeve movably mounted in a fixed sleeve, said movable sleeve encompassing and being axially and rotatively movable relative to the distributor slide, a fuel metering aperture between said movable sleeve and said follower piston, the shape of said fuel aperture being such that its cross-sectional area depends only on the relative axial displacement between said movable sleeve and said follower piston, a first orifice provided through the wall of said movable sleeve, in constant communication with a fuel delivery pipe connected to said fuel pump and with the upstream side of said fuel metering aperture, and having one longitudinal side parallel to the sleeve axis, and a second orifice, provided through the wall of said fixed sleeve, in constant communication with a return pipe to the fuel tank, said second orifice being intersected only by said longitudinal side of said first orifice, the common portion of said orifices thus forming a fuel valving aperture whose area is constant for any axial displacement of the movable sleeve relative to the fixed sleeve and variable in relation to the angular position of the movable sleeve relative to the fixed sleeve, a device responsive to the fuel pressure difference $\Delta p$ between the upstream and downstream sides of said metering aperture, a connecting device connecting said device responsive to the value $\Delta p$ with said movable sleeve and adapted to displace said movable sleeve circumferentially so as to maintain the value $\Delta p$ constant across said metering aperture, hydraulic connecting means connecting said control slide with said movable sleeve for controlling the axial displacement of said movable sleeve; said regulator further comprising a control device for controlling the turbojet engine nozzle and comprising a second sleeve connected with said movable sleeve and a second slide hydraulically connected with said device responsive to the value $p_2-p_1$.

2. In an automatic speed regulator for a turbojet engine including a compressor, fuel injectors, a variable area nozzle and a fuel pump that has a constant fuel discharge per rotation, a device including rotative weights which is responsive to rotational velocity and is rotated by said turbojet engine, a rotative and slidable control slide actuated by said device responsive to rotational velocity, a selector device for selecting the velocities operatively connected with said control slide, a device responsive to the pressure difference $p_2-p_1$ between the pressures at the output and input sides of the compressor, a limiting device for limiting fuel excesses and deficiencies controlled by said device responsive to the pressure difference $p_2-p_1$: a progressive fuel metering and valving device, said metering and valving device comprising a follower piston carrying a distributor slide, said control slide comprising a contact member cooperating with said follower piston for forming an adjustable escape aperture communicating with one of the faces of said follower piston, said metering and valving device further comprising a movable sleeve movably mounted in a fixed sleeve, said movable sleeve being axially and circumferentially movable relative to said distributor slide, the other face of said follower piston forming with one of the faces of said movable sleeve an annular chamber fed with a servo-motor fluid at constant pressure, a fuel metering aperture between said movable sleeve and said follower piston, the shape of said fuel aperture being such that its cross-sectional area depends only on the relative axial displacement between said movable sleeve and said follower piston, a first orifice provided through the wall of said movable sleeve, in constant communication with a fuel delivery pipe connected to said fuel pump and with the upstream side of said fuel metering aperture, and having one longitudinal side parallel to the sleeve axis, and a second orifice, provided through the wall of said fixed sleeve, in constant communication with a return pipe to the fuel tank, said second orifice being intersected only by said longitudinal side of said first orifice, the common portion of said orifices thus forming a fuel valving aperture whose area is constant for any axial displacement of the movable sleeve relative to the fixed sleeve and variable in relation to the angular position of the movable sleeve relative to the fixed sleeve, a device responsive to the fuel pressure difference $\Delta p$ between the upstream and downstream sides of said metering aperture, a connecting device connecting said device responsive to the value $\Delta p$ with said movable sleeve and adapted to displace said movable sleeve circumferentially so as to maintain the value $\Delta p$ constant across said metering aperture, hydraulic connecting means connecting said control slide with said movable sleeve for controlling the axial displacement of said movable sleeve; said regulator further comprising a control device for controlling the turbojet engine nozzle and comprising a second sleeve connected with said movable sleeve and a second slide hydraulically connected with said device responsive to the value $p_2-p_1$.

3. In an automatic speed regulator for a turbojet engine including a compressor, fuel injectors, a variable area nozzle and a fuel pump that has a constant fuel discharge per rotation, a device including rotative weights which is responsive to rotational velocity and is rotated by said turbojet engine, a rotative and slidable control slide actuated by said device responsive to rotational velocity, a selector device for selecting the velocities operatively connected with said control slide, a device responsive to the pressure difference $p_2-p_1$ between the pressures at the output and input sides of the compressor, a limiting device for limiting fuel excesses and deficiencies controlled by said device responsive to the pressure difference $p_2-p_1$; a progressive fuel metering and valving device, said metering and valving device comprising a follower piston carrying a distributor slide, said control slide comprising a contact member cooperating with said follower piston for forming an adjustable escape aperture communicating with one of the faces of said follower piston, said metering and valving device further comprising a movable sleeve movably mounted in a fixed sleeve, said movable sleeve being axially and circumferentially movable relative to said distributor slide, the other face of said follower piston forming with one of the faces of said movable sleeve an annular chamber fed with a servo-motor fluid at constant pressure, a fuel metering aperture between said movable sleeve and said follower piston, the shape of said aperture being such that its cross-sectional area depends only on the relative axial travel between said movable sleeve and said follower piston, a first orifice provided through the wall of said movable sleeve, in constant communication with a fuel delivery pipe connected to said fuel pump and with the upstream side of said fuel metering aperture, and having one longitudinal side parallel to the sleeve axis, and a second orifice, provided through the wall of said fixed sleeve, in constant communication with a return pipe to the fuel tank, said second orifice being intersected only by said longitudinal side of said first orifice, the common portion of said orifices thus forming a fuel valving aperture whose area is constant for any axial displacement of the movable sleeve relative to the fixed sleeve and variable in relation to the angular position of the movable sleeve relative to the fixed sleeve, a device responsive to the difference $\Delta p$ of the fuel pressures on the upstream and downstream sides of said metering aperture, a connecting device connecting said device responsive to the difference $\Delta p$ with said movable sleeve and adapted to displace said movable sleeve in the circumferential direction so as to maintain the value $\Delta p$ constant across said metering aperture, means for feeding said annular chamber with fluid at constant pressure, a first pressure chamber one wall of which is constituted by the other face of the movable sleeve, connecting means connecting said control slide with said first pressure chamber for feeding with fluid said first pressure chamber according to the position of said control slide; said regulator further comprising a turbojet engine nozzle control device comprising a second sleeve connected with said movable sleeve and a second slide connected hydraulically with said device responsive to the value $p_2-p_1$, whereby the velocity and the thrust of the turbojet engine may be varied simultaneously.

4. In an automatic speed regulator for a turbojet engine including a compressor, fuel injectors, a variable area nozzle and a fuel pump that has a constant fuel discharge per rotation, a device including rotative weights which is responsive to rotational velocity and is rotated by said turbojet engine, a rotative and slidable control slide actuated by said device responsive to rotational velocity, a selector device for selecting the velocities operatively connected with said control slide, a device responsive to the pressure difference $p_2-p_1$ between the pressures at the output and input sides of the compressor, a limiting device for limiting fuel excesses and deficiencies controlled by said device responsive to the pressure difference $p_2-p_1$; a progressive fuel metering and valving device, said metering and valving device comprising a follower piston carrying a distributor slide and hydraulically connected with said control slide and a movable sleeve movably mounted in a fixed sleeve said movable sleeve encompassing and being axially and rotatively movable relative to the distributor slide, a fuel metering aperture between said movable sleeve and said follower piston, the shape of said fuel aperture being such that its cross-sectional area depends only on the relative axial displacement between said movable sleeve and said follower piston on the control slide, an adjustable abutment limiting the minimum distance between the movable sleeve and the follower piston, a first orifice provided through the wall of said movable sleeve, in constant communication with a fuel delivery pipe connected to said fuel pump and with the upstream side of said fuel metering aperture, and having one longitudinal side parallel to the sleeve axis, and a second orifice, provided through the wall of said fixed sleeve, in constant communication with a return pipe to the fuel tank, said second orifice being intersected only by said longitudinal side of said first orifice, the common portion of said orifices thus forming a fuel valving aperture whose area is constant for any axial displacement of the movable sleeve relative to the fixed sleeve and variable in relation to the angular position of the movable sleeve relative to the fixed sleeve, a device responsive to the fuel pressure difference $\Delta p$ between the upstream and downstream sides of said metering aperture, a connnecting device connecting said device responsive to the value $\Delta p$ with said movable sleeve and adapted to displace said sleeve circumferentially so as to maintain the value $\Delta p$ constant across said metering means connecting said control slide with said movable sleeve for controlling the axial displacement of said movable sleeve; said regulator further comprising a control device for controlling the turbojet engine nozzle and comprising a second sleeve connected with said movable sleeve and a second slide hydraulically connected with said device responsive to the value $p_2-p_1$.

5. In an automatic speed regulator for a turbojet engine including a compressor, fuel injectors, a variable area nozzle and a fuel pump that has a constant fuel discharge per rotation, a device including rotative weights which is responsive to rotational velocity and is rotated by said turbojet engine, a rotative and slidable control slide actuated by said device responsive to rotational velocity, a selector device for selecting the velocities operatively connected with said control slide, a device responsive to the pressure difference $p_2-p_1$ between the pressures at the output and input sides of the compressor, a limiting device for limiting fuel excesses and deficiencies controlled by said device responsive to the pressure difference $p_2-p_1$; a progressive fuel metering and valving device, said metering and valving device comprising a follower piston carrying a distributor slide and hydraulically connected with said control slide and a movable sleeve movably mounted in a fixed sleeve, said movable sleeve encompassing and being axially and rotatively movable relative to the distributor slide, a fuel metering aperture between said movable sleeve and said follower piston, the shape of said fuel aperture being such that its cross-sectional area depends only on the relative axial displacement between said movable sleeve and said follower piston, a first orifice provided through the wall of said movable sleeve, in constant communication with a fuel delivery pipe connected to said fuel pump and with the upstream side of said fuel metering aperture, and having one longitudinal side parallel to the sleeve axis, and a second orifice, provided through the wall of said fixed sleeve, in constant communication with a return pipe to the fuel tank, said second orifice being intersected only by said longitudinal side of said first orifice, the common portion of said orifices thus forming a fuel valving aperture whose area is constant for any axial displacement of the movable sleeve relative to the fixed sleeve and variable in relation to the angular position of the movable sleeve relative to the fixed sleeve, a device responsive to the fuel pressure difference $\Delta p$ between the upstream and downstream sides of said metering aperture, a control rod carrying a shoulder and distributing the servo-motor fluid to a differential amplifier, the latter comprising a second pressure chamber, a second follower piston, two pistons and racks operatively connected with the latter and adapted to displace said movable sleeve circumferentially so as to maintain the value $\Delta p$ constant across said metering aperture, hydraulic connecting means connecting said control slide with said movable sleeve for controlling the axial displacement of said movable sleeve; said regulator further comprising a control device for controlling the turbojet engine nozzle and comprising a second sleeve connected with said movable sleeve and a second slide hydraulically connected with said device responsive to the value $p_2-p_1$.

6. In an automatic speed regulator for a turbojet engine including a compressor, fuel injectors, a variable area nozzle and a fuel pump that has a constant fuel discharge per rotation, a device including rotative weights which is responsive to rotational velocity and is rotated by said turbojet engine, a rotative and slidable control slide actuated by said device responsive to rotational velocity, a selector device for selecting the velocities operatively connected with said control slide, a device responsive to the pressure difference $p_2-p_1$ between the pressures at the output and input sides of the compressor, a limiting device for limiting fuel excesses and deficiencies controlled by said device responsive to the pressure difference $p_2-p_1$; a progressive fuel metering and valving device, said metering and valving device comprising a follower piston carrying a distributor slide hydraulically connected with said control slide and a movable sleeve movably mounted in a fixed sleeve, said movable sleeve being circumferentially and axially movable relative to said distributor slide, a metering aperture comprising rectangular slots through which passes the total amount of fuel supplied to the injectors the minimum flow included, a first orifice provided through the wall of said movable sleeve, in constant communication with a fuel delivery pipe connected to said fuel pump and with the upstream side of said fuel metering aperture, and having one longitudinal side parallel to the sleeve axis, and a second orifice, provided through the wall of said fixed sleeve, in constant communication with a return pipe to the fuel tank, said second orifice being intersected only by said longitudinal side of said first orifice, the common portion of said orifices thus forming a fuel valving aperture whose area is constant for any axial displacement of the movable sleeve relative to the fixed sleeve and variable in relation to the angular position of the movable sleeve relative to the fixed sleeve; a device responsive to the difference $\Delta p$ in the pressures of the fuel on the upstream and downstream sides of the metering aperture, a connecting device connecting said device responsive to the value $\Delta p$ with said movable sleeve and adapted to displace said movable sleeve circumferentially so as to maintain constant the value $\Delta p$ across said metering aperture, hydraulic connecting means for controlling the displacement of said movable sleeve; said slots being such that, taking into account the adjustment of the value $\Delta p$ to a constant value, the fuel flow is proportional to the travel of said movable sleeve; said regulator further comprising a turbojet engine nozzle control device comprising a second sleeve connected with said movable sleeve and a second slide hydraulically connected with said device responsive to the value $p_2-p_1$, whereby the velocity and thrust of the turbojet engine may be varied simultaneously.

7. In an automatic speed regulator for a turbojet engine including a compressor, fuel injectors, a variable area nozzle and a fuel pump that has a constant fuel discharge per rotation, a device including rotative weights which is responsive to rotational velocity and is rotated by said turbojet engine, a rotative and slidable control slide actuated by said device responsive to rotational velocity, a selector device for selecting the velocities operatively connected with said control slide, a device responsive to the pressure difference $p_2-p_1$ between the pressures at the output and input sides of the compressor, a limiting device for limiting fuel excesses and deficiencies controlled by said device responsive to the pressure difference $p_2-p_1$; a progressive fuel metering and valving device, said metering and valving device comprising a follower piston carrying a distributor slide, said control slide comprising a contact member cooperating with said follower piston for forming an adjustable escape aperture communicating with one of the faces of said follower piston, said metering and valving device further comprising a movable sleeve movably mounted in a fixed sleeve, said movable sleeve being axially and circumferentially movable relative to said distributor slide, the other face of said follower piston forming with one of the faces of said movable sleeve an annular chamber fed with a servo-motor fluid at constant pressure, a fuel metering aperture between said movable sleeve and said follower piston, the shape of said aperture being such that its cross-sectional area depends only on the relative axial travel between said movable sleeve and said follower piston, a first orifice provided through the wall of said movable sleeve, in constant communication with a fuel delivery pipe connected to said fuel pump and with the upstream side of said fuel metering aperture, and having one longitudinal side parallel to the sleeve axis, and a second orifice, provided through the wall of said fixed sleeve, in constant communication with a return pipe to the fuel tank, said second orifice being intersected only by said longitudinal side of said first orifice, the common portion of said orifices thus forming a fuel valving aperture whose area is constant for any axial displacement of the movable sleeve relative to the fixed sleeve and variable in relation to the angular position of the movable sleeve relative to the fixed sleeve, a device responsive to the difference $\Delta p$ of the fuel pressures on the upstream and downstream sides of said metering aperture, means for feeding fluid at constant pressure to said annular chamber, a first pressure chamber one wall of which is formed by the other face of said movable sleeve, a connecting device connecting said device responsive to the value $\Delta p$ with said movable sleeve for displacing the latter circumferentially so as to maintain constant the value $\Delta p$ across said metering aperture, said connecting device comprising a second pressure chamber, a first system of jets carried by said control slide for feeding and discharging said first pressure chamber in accordance with the position of said control slide, and a second system of jets carried by said control slide for feeding and discharging said second pressure chamber in accordance with the position of said control slide; said regulator further comprising a turbojet engine nozzle control device comprising a second sleeve connected with said movable sleeve and a second slide connected hydraulically with said device responsive to the value $p_2-p_1$, whereby the velocity and the thrust of the turbojet engine may be varied simultaneously.

8. Speed regulator as claimed in claim 7, wherein the first system of jets comprises jets formed on the control slide, these jets being formed in such manner that the flow therethrough increases with increase in the amount by which said control slide is displaced from its balanced position and include inclined recesses provided at the input and output ends of said jets, whereby the flow through these rotary jets is a function of the rotational velocity.

9. Speed regulator as claimed in claim 7, wherein the second system of jets comprises jets formed on the control slide, these jets including flat faces which are parallel to the axis of the control slide and are situated at the input and output ends of the jets, whereby the flow through these jets is constant whatever be the rotational velocity and the extent by which the control slide is displaced from its balanced position.

10. Speed regulator as claimed in claim 9, wherein said connecting device connecting said device responsive to the value $\Delta p$ with said movable sleeve comprises a control rod carrying shoulders which distribute the servo-motor fluid to a differential amplifier, said amplifier comprising said second pressure chamber, a follower piston and two pistons integral with racks adapted to displace said movable sleeve circumferentially, said shoulders being situated adjacent parallel very narrow slots oriented in the direction of said control rod so that the variation in said second pressure chamber is a function of the extent by which said control rod is displaced from its mean position, the maximum flow, obtained when said slots are completely open, being limited by the constant flow through said second system of jets.

11. In an automatic speed regulator for a turbojet engine comprising a compressor, a variable area section nozzle and a fuel pump having a constant delivery per rotation, a device responsive to rotational velocity having rotative weights driven in rotation by said turbojet engine, a control slide which is rotative and slidable actuated by said device responsive to velocity, a selecting device for selecting the velocity operatively connected with said control slide, a device responsive to the difference $p_2-p_1$ between the pressures on the output and input sides of the compressor, two abutments operatively connected with said device responsive to the value of $p_2-p_1$ for limiting the extent by which said control slide is displaced from its balanced position in both directions as a function of the value $p_2-p_1$; a progressive metering and valving device, said metering and valving device comprising a follower piston which carries a distributor slide and is hydraulically connected with said control slide, and a movable sleeve movably mounted in a fixed sleeve, said movable sleeve being axially and circumferentially movable with respect to said distributor slide, a fuel metering aperture between said movable sleeve and said follower piston, the shape of said fuel metering aperture being such that its cross-sectional area depends only on the relative axial displacement between said sleeve and said follower piston, a first orifice provided through the wall of said movable sleeve, in constant communication with a fuel delivery pipe connected to said fuel pump and with the upstream side of said fuel metering aperture and having one longitudinal side parallel to the sleeve axis, and a second orifice, provided through the wall of said fixed sleeve, in constant communication with a return pipe to the fuel tank, said second orifice being intersected only by said longitudinal side of said first orifice, the common portion of said orifices thus forming a fuel valving aperture whose area is constant for any axial displacement of the movable sleeve relative to the fixed sleeve and variable in relation to the angular position of the movable sleeve relative to the fixed sleeve, a device responsive to the fuel pressure difference $\Delta p$ between the upstream and downstream sides of said metering aperture, a connecting device connecting said device responsive to the value $\Delta p$ with said movable sleeve and adapted to displace said movable sleeve circumferentially so as to maintain the value $\Delta p$ constant across said metering aperture, hydraulic connecting means connecting said control slide with said movable sleeve for controlling the axial displacement of said movable sleeve; said regulator further comprising a control device for controlling the turbojet engine nozzle and comprising a second sleeve connected with said movable sleeve and a second slide hydraulically connected with said device responsive to the value $p_2-p_1$.

12. In an automatic speed regulator for a turbojet engine comprising a compressor, fuel injectors, a variable area section nozzle, a fuel pump having a constant delivery per rotation and a servo-motor controlling said nozzle, a device responsive to rotational velocity having rotative weights rotated by said turbojet engine, a control slide which is rotative and slidable and is actuated by said device responsive to velocity, a selecting device for selecting the velocity operatively connected with said control slide, a device responsive to the difference $p_2-p_1$ of the pressures at the output and the input sides of the compressor, a limiting device for limiting fuel excesses and deficiencies controlled by said device responsive to the difference $p_2-p_1$; a progressive fuel metering and valving device, said metering and valving device comprising a follower piston carrying a distributor slide and hydraulically connected with said control slide and a movable sleeve movably mounted in a fixed sleeve, said movable sleeve being axially and circumferentially movable with respect to said distributor slide, a fuel metering aperture between said movable sleeve and said follower piston, the shape of said aperture being such that the cross-sectional area thereof depends only on the relative axial displacement between said movable sleeve and said follower piston, a first orifice provided through the wall of said movable sleeve, in constant communication with a fuel delivery pipe connected to said fuel pump and with the upstream side of said fuel metering aperture, and having one longitudinal side parallel to the sleeve axis, and a second orifice, provided through the wall of said fixed sleeve, in constant communication with a return pipe to the fuel tank, said second orifice being intersected only by said longitudinal side of said first orifice, the common portion of said orifices thus forming a fuel valving aperture whose area is constant for any axial displacement of the movable sleeve relative to the fixed sleeve and variable in relation to the angular position of the movable sleeve relative to the fixed sleeve, a device responsive to the difference $\Delta p$ of the fuel pressures on the upstream and downstream sides of said metering aperture, a connecting device connecting said device responsive to the value $\Delta p$ with said movable sleeve adapted to displace said movable sleeve circumferentially so as to maintain constant the value $\Delta p$ across said metering aperture, hydraulic connecting means connecting said control slide with said movable sleeve for controlling the axial displacement of said movable sleeve; and a nozzle controlling device comprising an amplifier differential piston hydraulically connected with said device responsive to the difference $p_2-p_1$, said amplifier piston being integral with a second oil distributor slide comprising two shoulders and feeding the servo-motor for the nozzle, and a movable second sleeve slidable with respect to said second distributor slide and comprising distribution apertures opposite said shoulders and hydraulic and mechanically operative connection means connecting said second sleeve with said movable sleeve.

13. In an automatic speed regulator for a turbojet engine comprising a compressor, fuel injectors, a variable area section nozzle, a fuel pump having a constant delivery per rotation and a servo-motor controlling said nozzle, a device responsive to rotational velocity having rotative weights rotated by said turbojet engine, a control slide which is rotative and slidable and is actuated by said device responsive to velocity, a selecting device for selecting the velocity operatively connected with said control slide, a device responsive to the difference $p_2-p_1$ of the pressures at the output and the input sides of the compressor, a limiting device for limiting fuel excesses and deficiencies controlled by said device responsive to the difference $p_2-p_1$; a progressive fuel metering and valving device, said metering and valving device comprising a follower piston carrying a distributor slide and said control slide comprising a contact member cooperating with said follower piston for forming an adjustable escape aperture communicating with one of the faces of said follower piston, said metering and valving device further comprising a movable sleeve movably mounted in a fixed sleeve, said movable sleeve being axially and circumferentially movable relative to said distributor slide, the other face of said follower piston forming with one of the faces of said movable sleeve an annular chamber fed with a servo-motor fluid at constant pressure, a fuel metering aperture between said movable sleeve and said follower piston, the shape of said aperture being such that the cross-sectional area thereof depends only on the relative axial displacement between said movable sleeve and said follower piston, a first orifice provided through the wall of said movable sleeve, in constant communication with a fuel delivery pipe connected to said fuel pump and with the upstream side of said fuel metering aperture, and having one longitudinal side parallel to the sleeve axis, and a second orifice, provided through the wall of said fixed sleeve, in constant communication with a return pipe to the fuel tank, said second orifice being intersected only by said longitudinal side of said first orifice, the common portion of said orifices thus forming a fuel valving aperture whose area is constant for any axial displacement of the movable sleeve relative to the fixed sleeve and variable in relation to the angular position of the movable sleeve relative to the fixed sleeve, a device responsive to the difference $\Delta p$ of the fuel pressures on the upstream and downstream sides of said metering aperture, a connecting device connecting said device responsive to the value $\Delta p$ with said movable sleeve adapted to displace said movable sleeve circumferentially so as to maintain constant the value $\Delta p$ across said metering aperture, means for feeding a fluid at a constant pressure to said annular chamber, a first pressure chamber one of the walls of which is formed by the other face of said movable sleeve, connecting means connecting said control slide with said first pressure chamber for feeding fluid to the latter in accordance with the position of said control slide, and a nozzle controlling device comprising an amplifier differential piston hydraulically connected with said device responsive to the difference $p_2-p_1$, said amplifier piston being integral with a second oil distributor slide comprising two shoulders and feeding the servo-motor for the nozzle, and a movable second sleeve slidable with respect to said second distributor slide and comprising distribution apertures opposite said shoulders, said second sleeve being subject on its annular face adjacent said amplifier piston to the constant pressure of the servo-motor fluid and on its other face to the pressure prevailing in the first pressure chamber, and hydraulic and mechanically operative connecting means connecting said second sleeve with said movable sleeve.

14. Speed regulator as claimed in claim 13, wherein the ratio between the annular surface and the total surface of said movable sleeve and of said second sleeve are not exactly identical so that the mechanically operative connection always has a force difference to transmit whereby play is eliminated in the mechanically operative connection.

15. Speed regulator as claimed in claim 12, further comprising a balancing valve disposed in the feed passageway which supplies the servo-motor fluid of the distributor slide of the nozzle control device, said balancing valve comprising a cylinder, a piston slidable in said cylinder and subject on one of its sides to the pressure of the servo-motor fluid and on the other side to the pressure of injection, said piston uncovering, when the pressure of injection is low, an aperture which puts the servo-motor fluid in communication with an escape passageway, the pressure of the servo-motor fluid being in this way adjusted to equal the pressure of fuel injection.

16. Speed regulator as claimed in claim 1, further comprising a fully closing cock device disposed in the fuel conduit communicating with the injectors, the key of said cock being operatively connected with the control lever of the turbojet engine.

17. Speed regulator as claimed in claim 16, for a turbojet engine comprising double flow injectors, comprising a piston housed in the key of said cock, said piston being subject on one of its sides to the adjusted fluid pressure and on its other side to the pressure of fuel injection, whereby said piston closes off the fuel flow to the large flow injectors when said pressure of fuel injection is less than said adjusted fluid pressure.

18. Speed regulator as claimed in claim 17, wherein said device responsive to the value $\Delta p$ comprises a diaphragm subject on either side to the pressures of the fuel on the upstream and downstream sides respectively of said metering aperture, the speed regulator further comprising a by-pass jet in the passageway through which the fuel pressure injected communicates with said faces of the diaphragm, said by-pass jet being opened by said key in its "stop" position for putting the passageway in communication with a calibrated escape aperture, whereby a pressure difference is maintained on either side of said diaphragm.

References Cited in the file of this patent

UNITED STATES PATENTS 2,545,703    Orr _____ Mar. 20, 1951

FOREIGN PATENTS 941,556    France _____ July 19, 1948